(12) United States Patent
Wellner et al.

(10) Patent No.: US 6,522,228 B2
(45) Date of Patent: Feb. 18, 2003

(54) CIRCUIT BREAKER INCLUDING AN ARC FAULT TRIP ACTUATOR HAVING AN INDICATOR LATCH AND A TRIP LATCH

(75) Inventors: Edward Louis Wellner, Colgate, WI (US); Peter Lee Nerstrom, Sarasota, FL (US); Mark Allan Juds, New Berlin, WI (US); Paul Jason Rollmann, Milwaukee, WI (US); Thomas Michael Hall, Bradenton, FL (US)

(73) Assignee: Eaton Corporation, Cleveland, OH (US)

( * ) Notice: Subject to any disclaimer, the term of this patent is extended or adjusted under 35 U.S.C. 154(b) by 0 days.

(21) Appl. No.: 09/845,517

(22) Filed: Apr. 30, 2001

(65) Prior Publication Data

US 2002/0158726 A1 Oct. 31, 2002

(51) Int. Cl.$^7$ .............................................. H01H 73/12
(52) U.S. Cl. ........................... 335/18; 335/17; 335/167; 200/317
(58) Field of Search ..................... 335/17–18, 167–176, 335/202; 361/42–51; 200/310, 314, 317

(56) References Cited

U.S. PATENT DOCUMENTS

| 5,224,006 A | 6/1993 | MacKenzie et al. |
|---|---|---|
| 5,459,446 A | 10/1995 | Vidal et al. |
| 5,546,266 A | 8/1996 | MacKenzie et al. |
| 5,691,869 A | 11/1997 | Engel et al. |
| 5,831,500 A | 11/1998 | Turner et al. |
| 5,847,913 A | 12/1998 | Turner et al. |
| 6,084,756 A | 7/2000 | Doring et al. |
| 6,107,902 A | * 8/2000 | Zhang et al. .................. 335/17 |

FOREIGN PATENT DOCUMENTS

| DE | 3313048 C1 | 9/1984 |
|---|---|---|
| WO | WO98/35237 | 8/1998 |

* cited by examiner

*Primary Examiner*—Lincoln Donovan
(74) *Attorney, Agent, or Firm*—Marvin L. Union

(57) ABSTRACT

A circuit breaker includes a housing; separable contacts mounted in the housing; a latchable operating mechanism including a latch lever which when released opens the separable contacts; and an overcurrent assembly responsive to selected conditions of current flowing through the separable contacts for releasing the latch lever to trip the separable contacts open. The circuit breaker also includes an arc fault indicator; an arc fault trip actuator which when energized moves a first indicator latch for actuating the arc fault indicator and a second latch for releasing the latch lever to trip the separable contacts open; and an arc fault current assembly responsive to selected arc fault conditions of current flowing through the separable contacts for energizing the arc fault trip actuator to actuate the arc fault indicator and to trip the separable contacts open.

10 Claims, 22 Drawing Sheets

CIRCUIT BREAKER INCLUDING AN ARC FAULT TRIP ACTUATOR HAVING AN INDICATOR LATCH AND A TRIP LATCH

CROSS-REFERENCE TO RELATED APPLICATIONS

This application is related to commonly assigned, concurrently filed U.S. patent application Ser. No. 09/845,943, filed Apr. 30, 2001, entitled "Circuit Breaker Having A Movable And Illuminable Arc Fault Indicator"; and U.S. patent application Ser. No. 09/845,519, filed Apr. 30, 2001, entitled "Circuit Breaker".

This application is also related to commonly assigned, co-pending U.S. patent application Ser. No. 09/506,871, filed Feb. 15, 2000, entitled "Circuit Breaker With Instantaneous Trip Provided By Main Conductor Routed Through Magnetic Circuit Of Electronic Trip Motor".

BACKGROUND OF THE INVENTION

1. Field of the Invention

This invention relates to electrical switching apparatus and, more particularly, to circuit breakers, such as, for example, arc fault circuit breakers.

2. Background Information

Circuit breakers are used to protect electrical circuitry from damage due to an overcurrent condition, such as an overload condition or a relatively high level short circuit or fault condition. In small circuit breakers, commonly referred to as miniature circuit breakers, used for residential and light commercial applications, such protection is typically provided by a thermal-magnetic trip device. This trip device includes a bimetal, which heats and bends in response to a persistent overcurrent condition. The bimetal, in turn, unlatches a spring powered operating mechanism, which opens the separable contacts of the circuit breaker to interrupt current flow in the protected power system.

Subminiature circuit breakers are used, for example, in aircraft electrical systems where they not only provide overcurrent protection but also serve as switches for turning equipment on and off. As such, they are subjected to heavy use and, therefore, must be capable of performing reliably over many operating cycles. They also must be small to accommodate the high-density layout of circuit breaker panels, which make circuit breakers for numerous circuits accessible to a user. Aircraft electrical systems usually consist of hundreds of circuit breakers, each of which is used for a circuit protection function as well as a circuit disconnection function through a push-pull handle.

The circuit breaker push-pull handle is moved from in-to-out in order to open the load circuit. This action may be either manual or, else, automatic in the event of an overload or fault condition. If the push-pull handle is moved from out-to-in, then the load circuit is re-energized. If the load circuit had been automatically de-energized, then the out-to-in operation of the push-pull handle corresponds to a circuit breaker reset action.

Typically, subminiature circuit breakers have only provided protection against persistent overcurrents implemented by a latch triggered by a bimetal responsive to $I^2R$ heating resulting from the overcurrent. There is a growing interest in providing additional protection, and most importantly arc fault protection. Arc faults are typically high impedance faults and can be intermittent. Nevertheless, such arc faults can result in a fire.

Although many circuit breakers also employ ground fault protection, in aircraft applications, the aircraft frame is ground, and there is no neutral conductor. Some aircraft systems have also provided ground fault protection, but through the use of additional devices, namely current transformers which in some cases are remotely located from the protective relay.

During sporadic arcing fault conditions, the overload capability of the circuit breaker will not function since the root-mean-squared (RMS) value of the fault current is too small to activate the automatic trip circuit. The addition of electronic arc fault sensing to a circuit breaker can add one of the elements required for sputtering arc fault protection - ideally, the output of an electronic arc fault sensing circuit directly trips and, thus, opens the circuit breaker. It is still desirable, however, to provide separate indications in order to distinguish an arc fault trip from an overcurrent-induced trip.

Finally, there is an interest in providing an instantaneous trip in response to very high overcurrents such as would be drawn by a short circuit.

The challenge is to provide alternative protection and separate indications in a very small package, which will operate reliably with heavy use over a prolonged period. A device which meets all the above criteria and can be automatically assembled is desirable.

In aircraft applications, two practical considerations make automatic operation difficult to achieve and, possibly, undesirable. First, the design of a conventional aircraft circuit breaker makes it difficult to add an externally initiated tripping circuit thereto. Second, certain circuits on an aircraft are so critical that manual intervention by a crewmember may be desirable before a circuit is de-energized.

U.S. Pat. No. 5,546,266 discloses a circuit interrupter including ground fault and arcing fault trip circuits, and indicators, such as LEDs, to produce an indication of the cause of the trip.

U.S. Pat. No. 5,831,500 discloses a circuit breaker employing a trip flag, a status insert and a status flag that are viewable through a lens based upon the trip, open, and closed positions, respectively, of the circuit breaker.

U.S. Pat. No. 5,847,913 discloses a circuit breaker employing ground fault interruption and arc fault detecting circuitry. Conduits are provided in the circuit breaker housing for conveying light or reflecting light between light sources, plungers or bimetal disks and an opening of the housing.

U.S. Pat. No. 6,084,756 discloses a tester for an arc fault circuit breaker in which an indicator is extinguished when a circuit breaker responds to an arc fault condition.

There is room for improvement in circuit breakers.

SUMMARY OF THE INVENTION

The present invention is directed to a circuit breaker, which employs a dual trip, dual latch trip magnetic actuator. The magnetic actuator releases both a first indicator latch, which controls an arc fault trip indicator, and a second primary latch, which holds the circuit breaker closed. When an arc fault trip condition is detected, the coil of the magnetic actuator is energized, and the first latch for the trip indicator is attracted to the core of the magnet. Moving the first latch, in this manner, releases an indicator to indicate that an arc fault has occurred. Also, the second primary latch is attracted to the core of the magnet, thereby opening the circuit breaker separable contacts.

According to the invention, a circuit breaker comprises: a housing; separable contacts mounted in the housing; a latchable operating mechanism including a latch member which when released opens the separable contacts; an overcurrent assembly responsive to selected conditions of current flowing through the separable contacts for releasing the latch member to trip the separable contacts open; an arc fault indicator; an arc fault trip actuator which when energized moves a first latch for releasing the arc fault indicator and a second latch for releasing the latch member to trip the separable contacts open; and an arc fault current assembly responsive to selected arc fault conditions of current flowing through the separable contacts for energizing the arc fault trip actuator to actuate the arc fault indicator and to trip the separable contacts open.

BRIEF DESCRIPTION OF THE DRAWINGS

A full understanding of the invention can be gained from the following description of the preferred embodiments when read in conjunction with the accompanying drawings in which.

DESCRIPTION OF THE PREFERRED EMBODIMENTS

The invention will be described as applied to a subminiature circuit breaker for use in aircraft alternating current (AC) systems, which are typically 400 Hz, but can also be used in direct current (DC) systems. It will also become evident that the invention is applicable to other types of circuit breakers including those used in AC systems operating at other frequencies; to larger circuit breakers, such as miniature residential or commercial circuit breakers; and to a wide range of circuit breaker applications, such as, for example, residential, commercial, industrial, aerospace, and automotive. As further non-limiting examples, both AC (e.g., 120, 220, 480–600 VAC) operation at a wide range of frequencies (e.g., 50, 60, 120, 400 Hz) and DC operation (e.g., 42 VDC) are possible.

Figure 1:
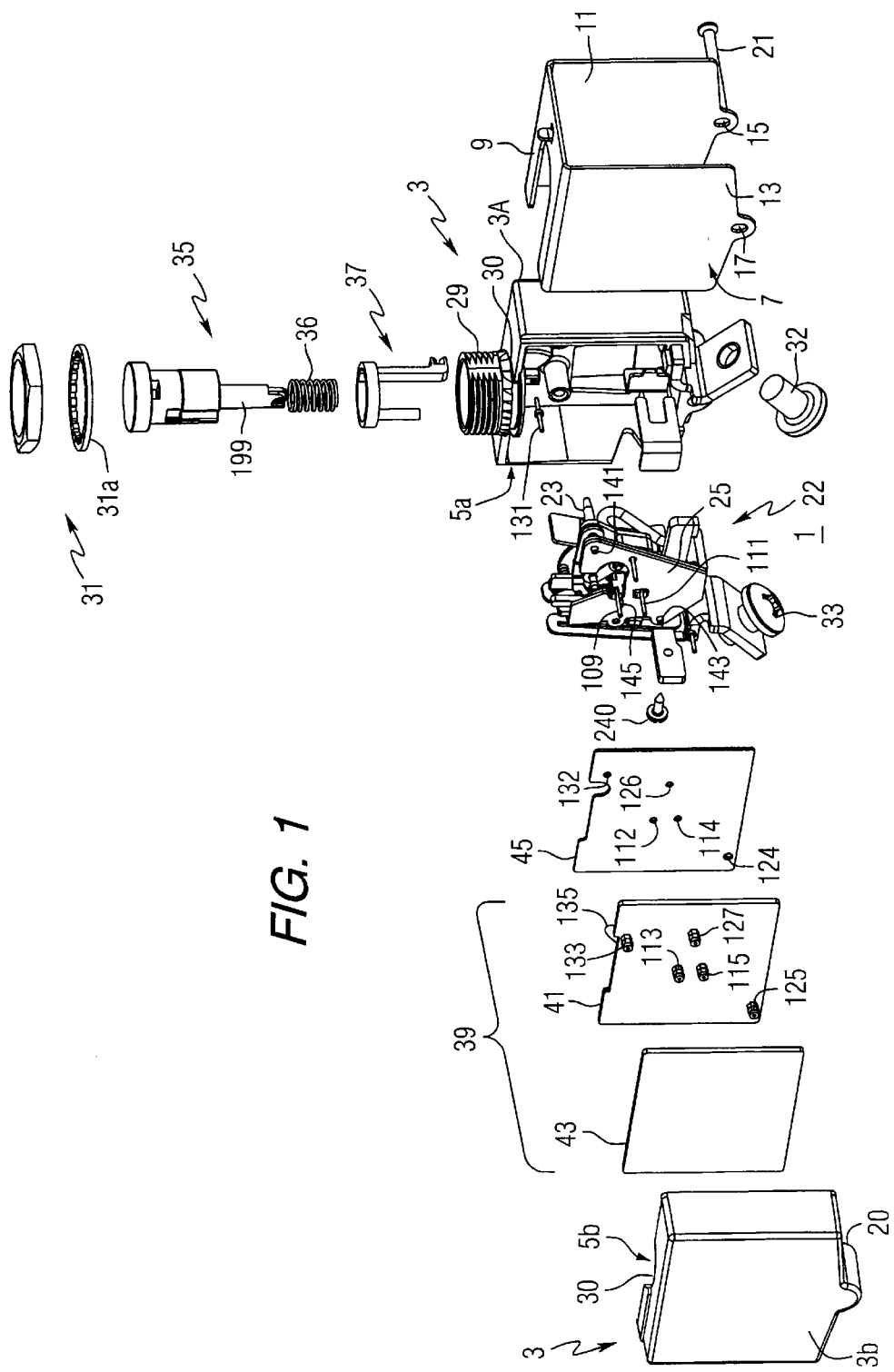
FIG. 1 is an exploded isometric view of a circuit breaker in accordance with the present invention.
Figure 2:
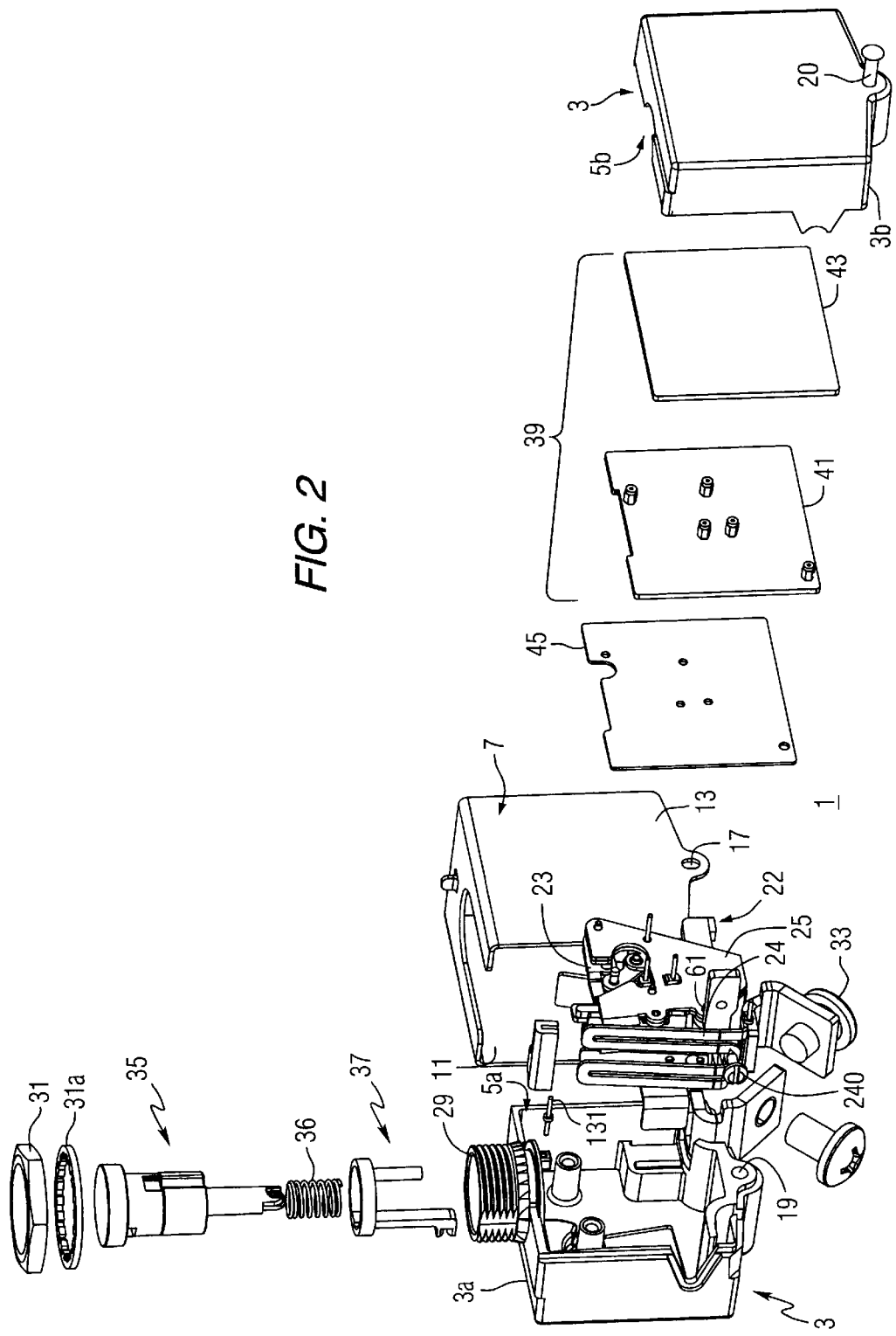
FIG. 2 is another exploded isometric view from the opposite end of FIG. 1.
Figure 19:
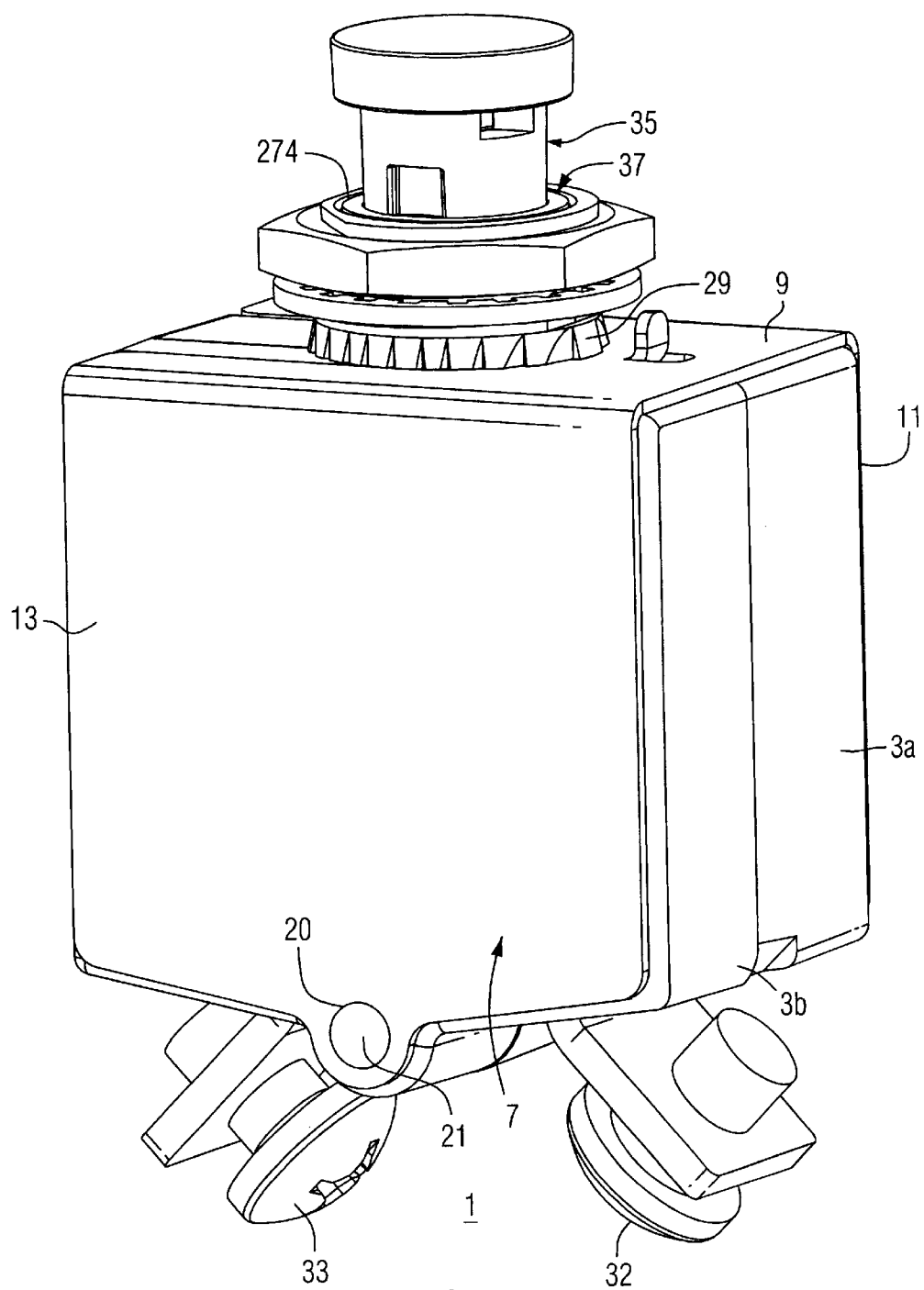
FIG. 19 is a view similar to FIG. 18 but showing the handle and the arc fault indicator assembly in the normal positions.

Referring to FIGS. 1 and 2, an exemplary circuit breaker 1 has a housing 3 formed by first and second sections 3a and 3b molded of an insulative resin which sections are joined along a mating plane to form an enclosure from confronting cavities 5a and 5b, respectively. The circuit breaker 1 also includes an external clip plate 7 having a top 9 and two sides 11,13 disposed therefrom. The clip plate side 11 captures the section or molded case 3a and the other clip plate side 13 captures the other section or molded cover 3b. Each of the sides 11,13 includes an opening 15,17, respectively, proximate the bottom of the corresponding side. The molded case 3a and the molded cover 3b each have a respective opening 19 (shown in FIG. 2) and 20 therethrough. A fastener 21, such as a rivet, is disposed through the opening 15 of the side 11, through the openings 19,20 of the molded case 3a and the molded cover 3b, and through the opening 17 of the side 13, in order to draw the one side 11 toward the other side 13 and, thereby, secure the molded case 3a to the molded cover 3b (as best shown in FIG. 19).

Figure 4:
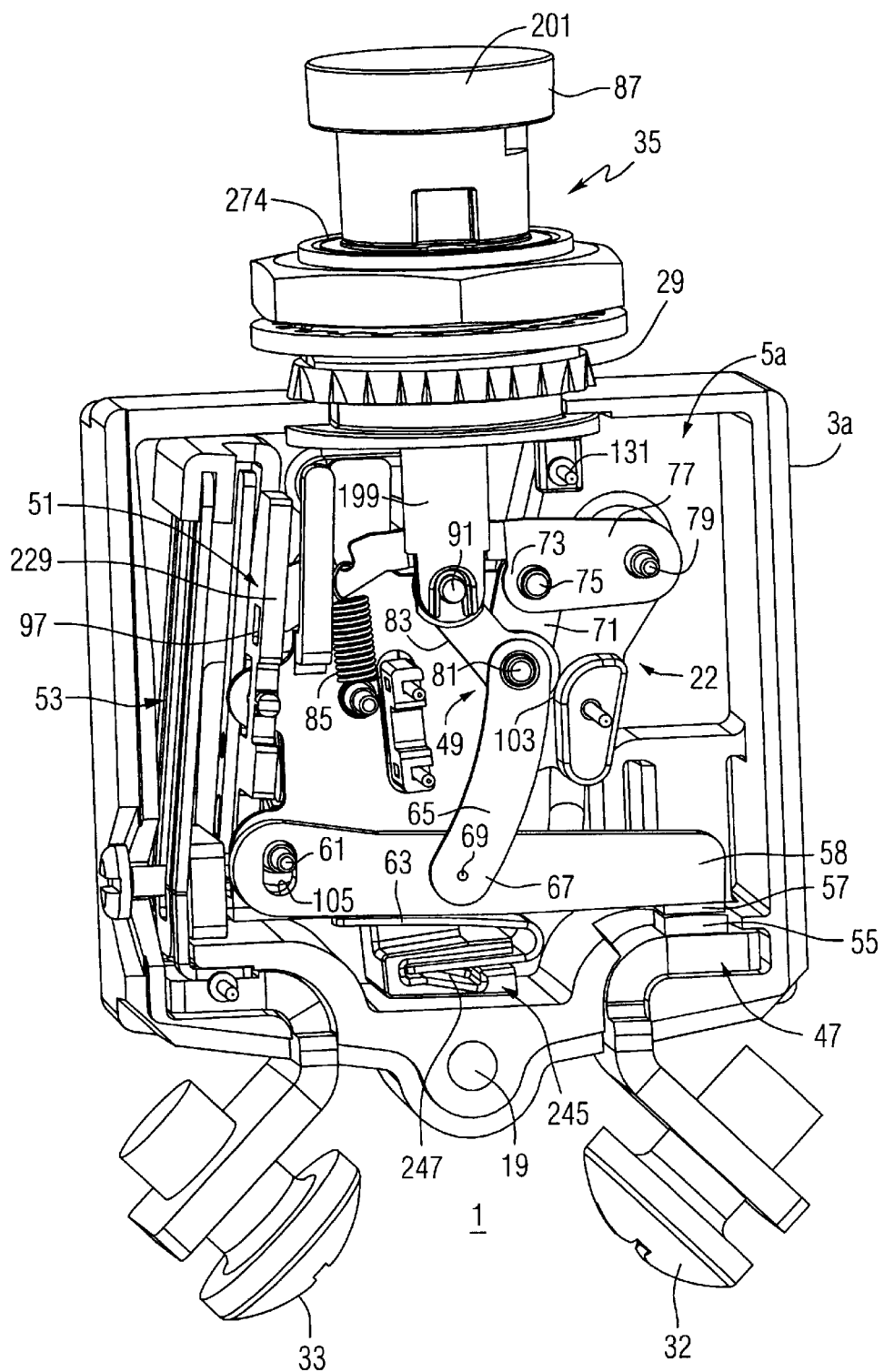
FIG. 4 is a view similar to FIG. 3 but showing the circuit breaker in the on condition.
Figure 6:
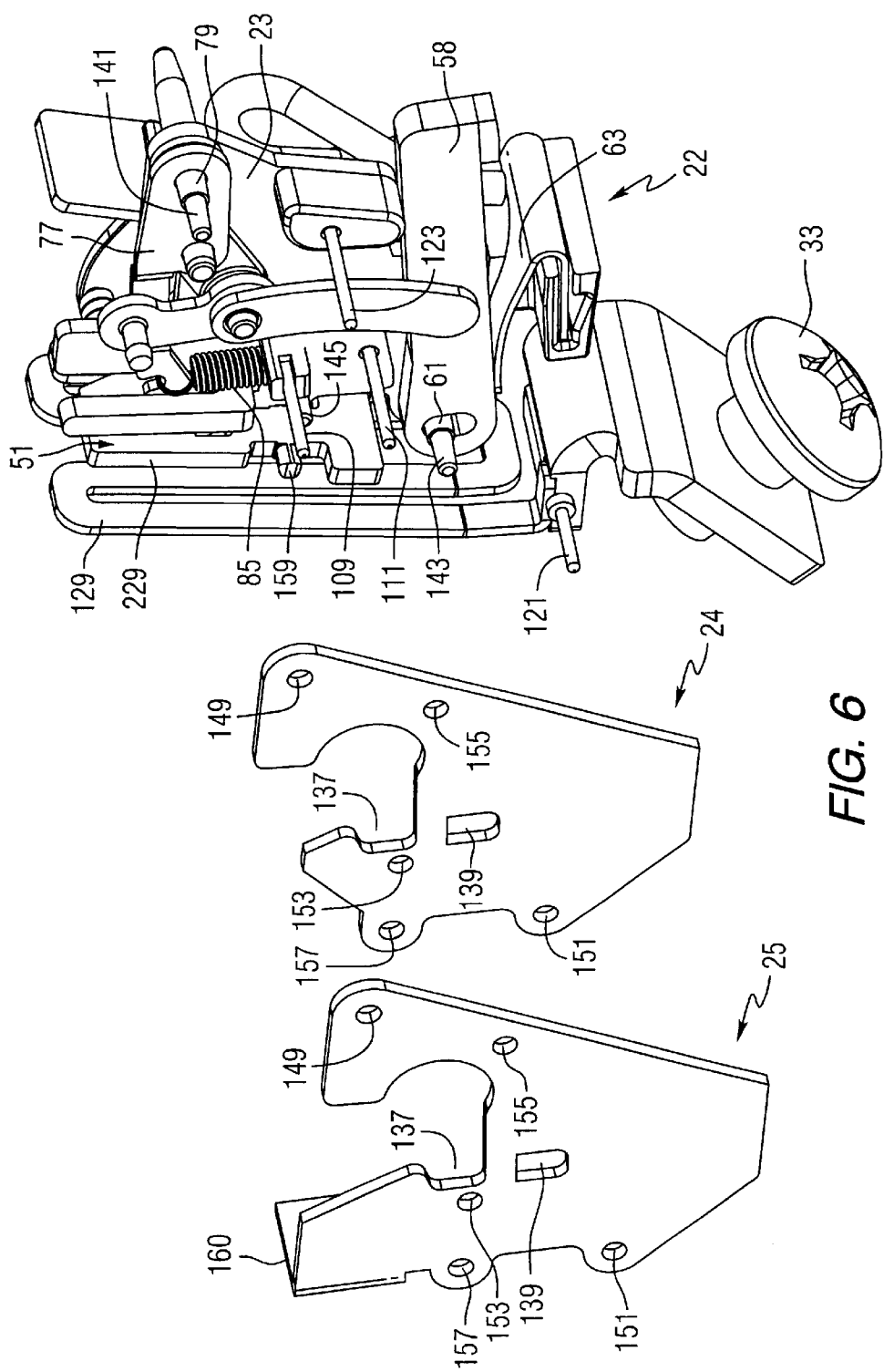
FIG. 6 is an exploded isometric view of the operating mechanism and two top plates of the circuit breaker of FIG. 1.
Figure 7:
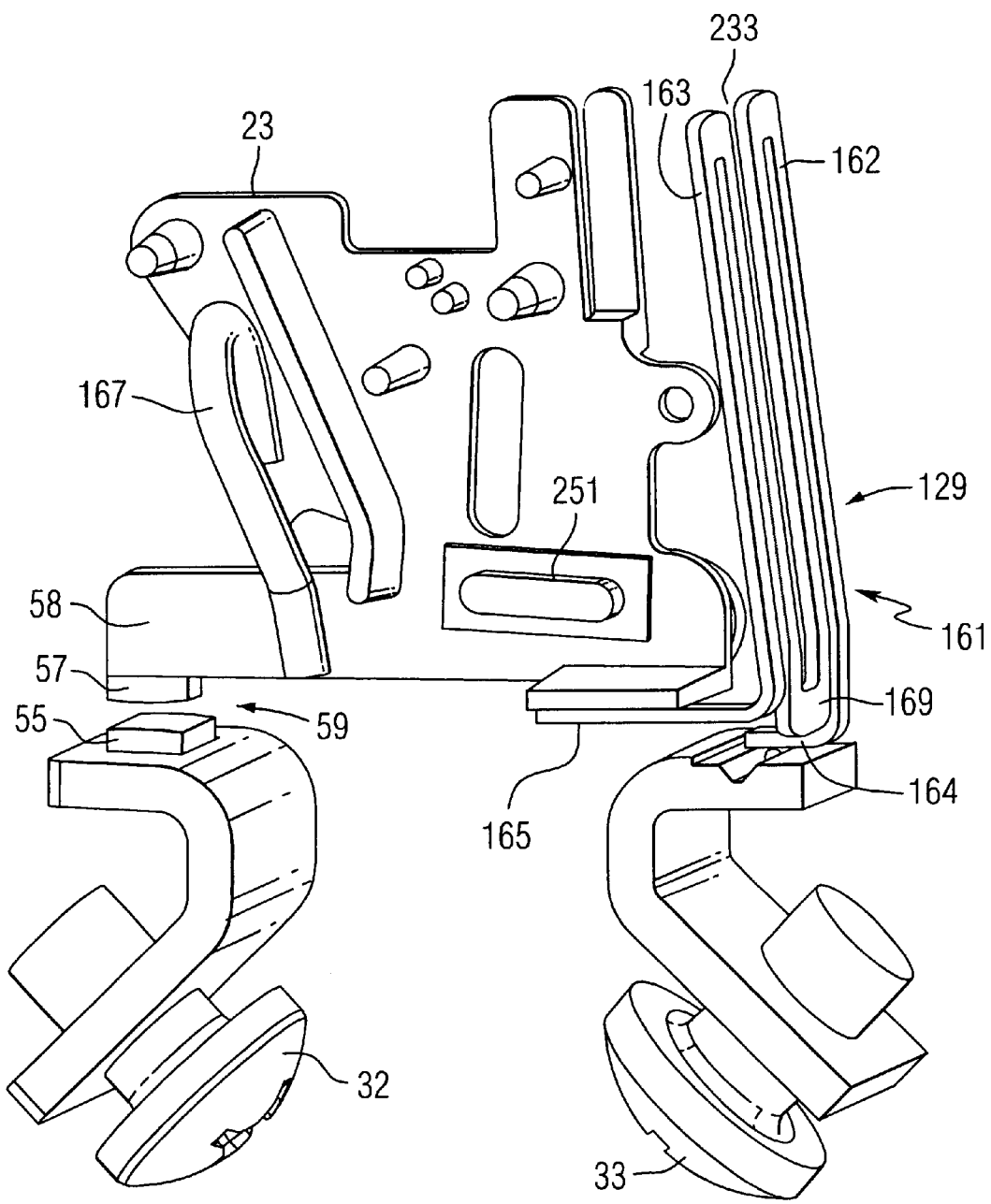
FIG. 7 is an isometric view of the load terminal, bimetal, mechanism plate, movable contact arm and line terminal of the circuit breaker of FIG. 1.

The circuit breaker 1 further includes an operating mechanism 22 mounted on a support mechanism such as the exemplary mechanism jig plate 23 (as best shown in FIGS. 4 and 7), a first mechanism top plate 24, a second mechanism top plate 25 (the top plates 24,25 are best shown in FIG. 6), and a bezel 29 mounted in an opening 30 of the housing 3. The bezel 29 is held in place by the external clip plate 7 and housing 3. In turn, a suitable fastener, such as the exemplary nut 31 and washer 31a mount the circuit breaker 1 to a mounting panel (not shown). The circuit breaker 1 also includes a line terminal 32, a load terminal 33, and an operating handle assembly 35, which protrudes through the opening 30 and the bezel 29. The operating handle assembly 35 is suitably biased away from the opening 30 by a spring 36. For ON/OFF operation, the handle assembly 35 is driven up by springs 63 and 36. Spring 36 is employed on trip operations to reset the handle assembly 35 to the OFF position.

The circuit breaker 1 further includes a movable and illuminable arc fault indicator 37, an arc fault detector 39 including exemplary printed circuit boards (PCBs) 41,43, and an insulator 45. Suitable arc fault detectors are disclosed, for instance, in U.S. Pat. No. 5,224,006, with a preferred type described in U.S. Pat. No. 5,691,869, which are hereby incorporated by reference. In the exemplary embodiment, the mechanism plate 23 is electrically conductive and is preferably made of stainless steel or brass. The operating mechanism 22 is assembled to and supported by the mechanism plate 23, which is mounted in the cavity 5a of the molded section 3a, and the PCBs 41,43 are mounted in the cavity 5b of the molded section 3b.

Figure 3:
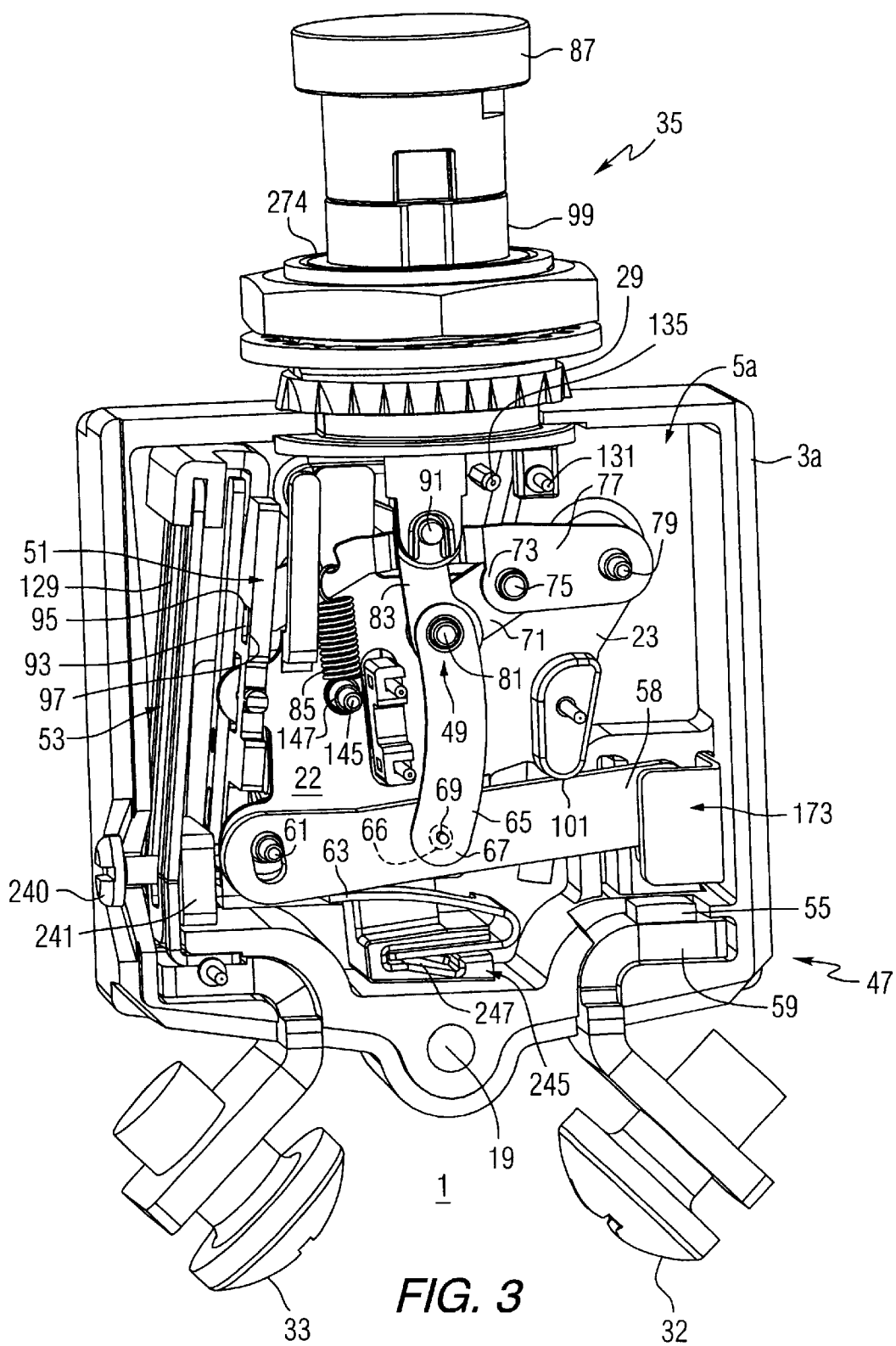
FIG. 3 is a front elevation view of the circuit breaker of FIG. 1, with one-half of the cover and two top plates removed, showing the circuit breaker in the off condition.
Figure 5:
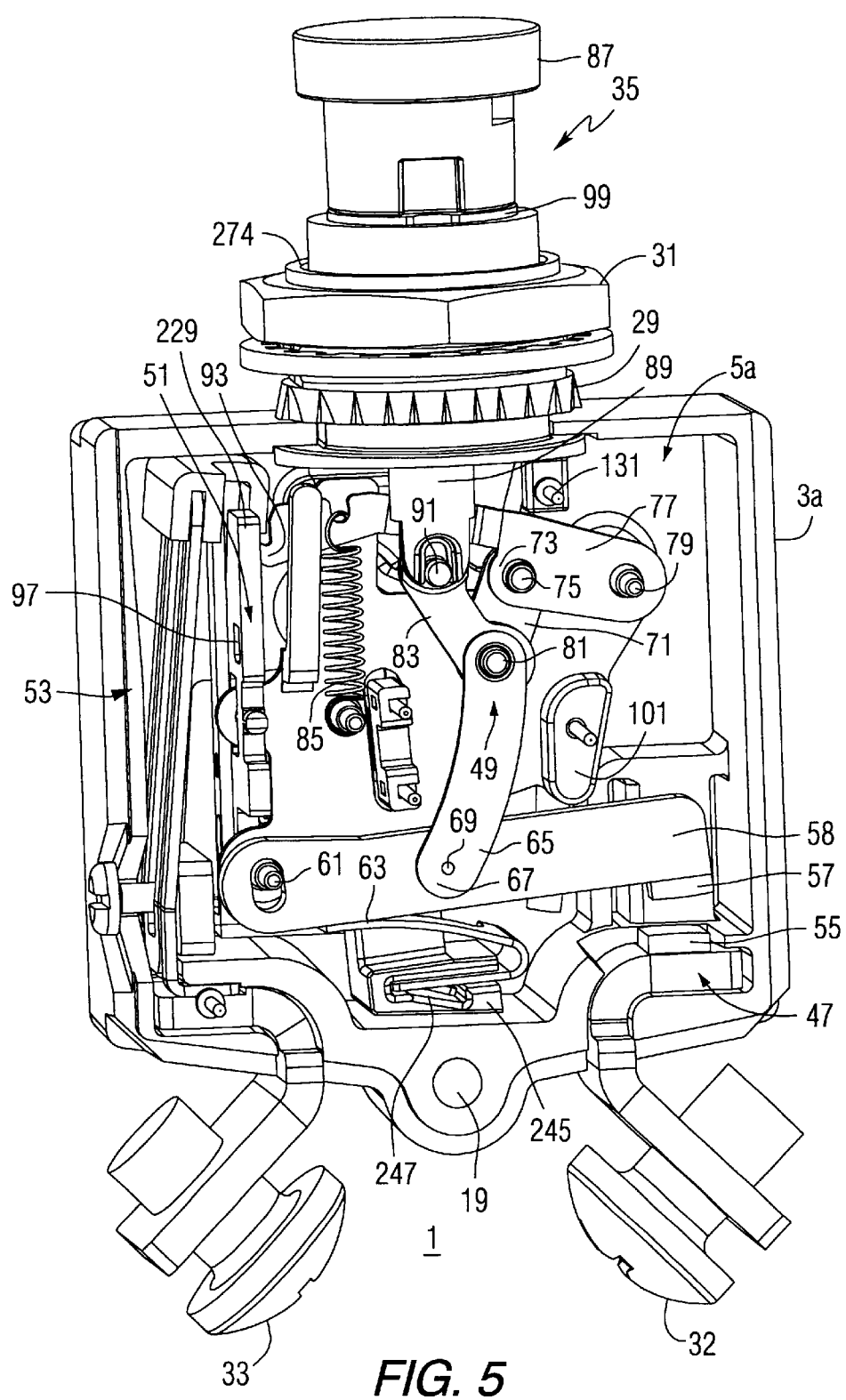
FIG. 5 is a view similar to FIG. 3 but showing the circuit breaker in the tripped condition.

Referring to FIGS. 3–5, the functional components of the circuit breaker 1 include a separable contact assembly 47 (as best shown in FIGS. 4 and 5), a toggle mechanism 49, the handle assembly 35, a latch member assembly 51, and an overcurrent assembly 53. The toggle mechanism 49, handle assembly 35, and latch assembly 51 form the latchable operating mechanism 22. The circuit breaker 1 also includes the line terminal 32 and the load terminal 33 supported in the bottom of the molded case 3a and having cantilevered sections extending outside of the case 3 for connection to respective line and load conductors (not shown).

As discussed below in connection with FIG. 12, the overcurrent assembly 53 includes a trip motor 119 (for arc fault conditions), and a bimetal 129 (for persistent overcurrent conditions). The overcurrent assembly 53 also includes an instantaneous trip function, which like the trip motor 119 and bimetal 129, actuate the latch assembly 51 to trip open the separable contact assembly 47.

The separable contact assembly 47 includes a fixed contact 55 fixed to the line terminal 32 and a moveable contact 57 carried by and electrically connected to a movable contact arm 58 within the housing 3. The fixed contact 55 and moveable contact 57 together form a set of separable contacts 59. The contact arm 58 is pivotally mounted on a metal pin 61, which is part of mechanism plate 23. The plates 24,25 (FIG. 6) retain the contact arm 58 on the pin 61. A cantilever leaf spring 63 forms a main spring, which biases the contact arm 58 counter-clockwise (with respect to FIGS. 3–5) to open the separable contacts 59 (as shown in FIG. 5). As discussed below in connection with FIG. 7, the load terminal 33 is electrically interconnected with the contact arm 58 and the moveable contact 57, and the line terminal 32 is electrically connected to the fixed contact 55. The latchable operating mechanism 22 functions to open (FIGS. 3 and 5) and close (FIG. 4) the separable contacts 59.

The contact arm 58 is pivoted between open (FIG. 3) and closed (FIG. 4) positions of the separable contacts 59 by the toggle mechanism 49. This toggle mechanism 49 includes a lower toggle link 65 pivotally connected by a pin 66 (shown in hidden line drawing in FIG. 3) at a first or lower end 67 to the contact arm 58 at a pivot point 69. In this manner, the toggle mechanism 49 is mechanically coupled to the separable contacts 59 for opening and closing such separable contacts.

A second toggle link 71 is pivotally connected at a first or upper end 73 by a pin 75 to a latch lever 77, which in turn is pivotally mounted by a metal pin 79 that is part of mechanism plate 23. The second ends of the first toggle link 65 and the second toggle link 71 are pivotally connected by a knee pin 81. The toggle mechanism 49 further includes a drive link 83, which mechanically couples the toggle mechanism 49 to the handle assembly 35.

Whenever the latch assembly 51 is actuated, the latch lever 77 is unlatched and the main spring 63 drives the movable contact arm 58 upward in order to open the separable contacts 59. Also, through movement of the links 65, 71, the latch lever 77 is rotated clockwise (with respect to FIG. 5). From this tripped position, the spring 36 (FIGS. 1 and 2) returns the handle assembly 35 to the OFF position, and the latch lever return spring 85 returns the latch lever 77, in order that it can be engaged by the latch member assembly 51. Otherwise, the latch assembly 51 latches the latch lever 77 and the toggle mechanism 49 in a latched condition (FIGS. 3 and 4) in which the toggle mechanism 49 is manually operable by the handle assembly 35 between a toggle open position (FIG. 3) and a toggle closed position (FIG. 4) to open and close the separable contacts 59.

Figure 14:
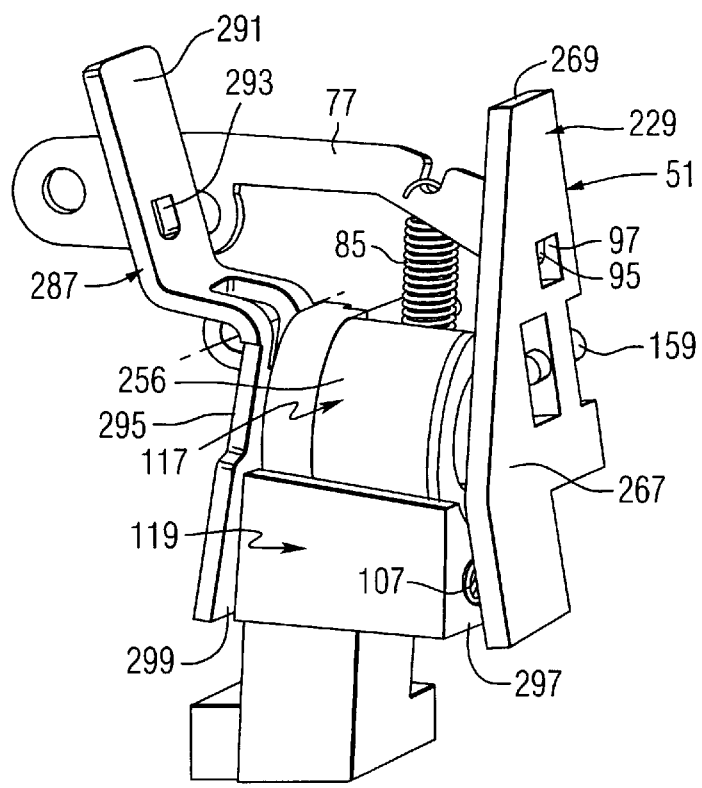
FIG. 14 an isometric view of the dual trip, dual latch trip actuator of the circuit breaker of FIG. 1 in the latched position.
Figure 15:
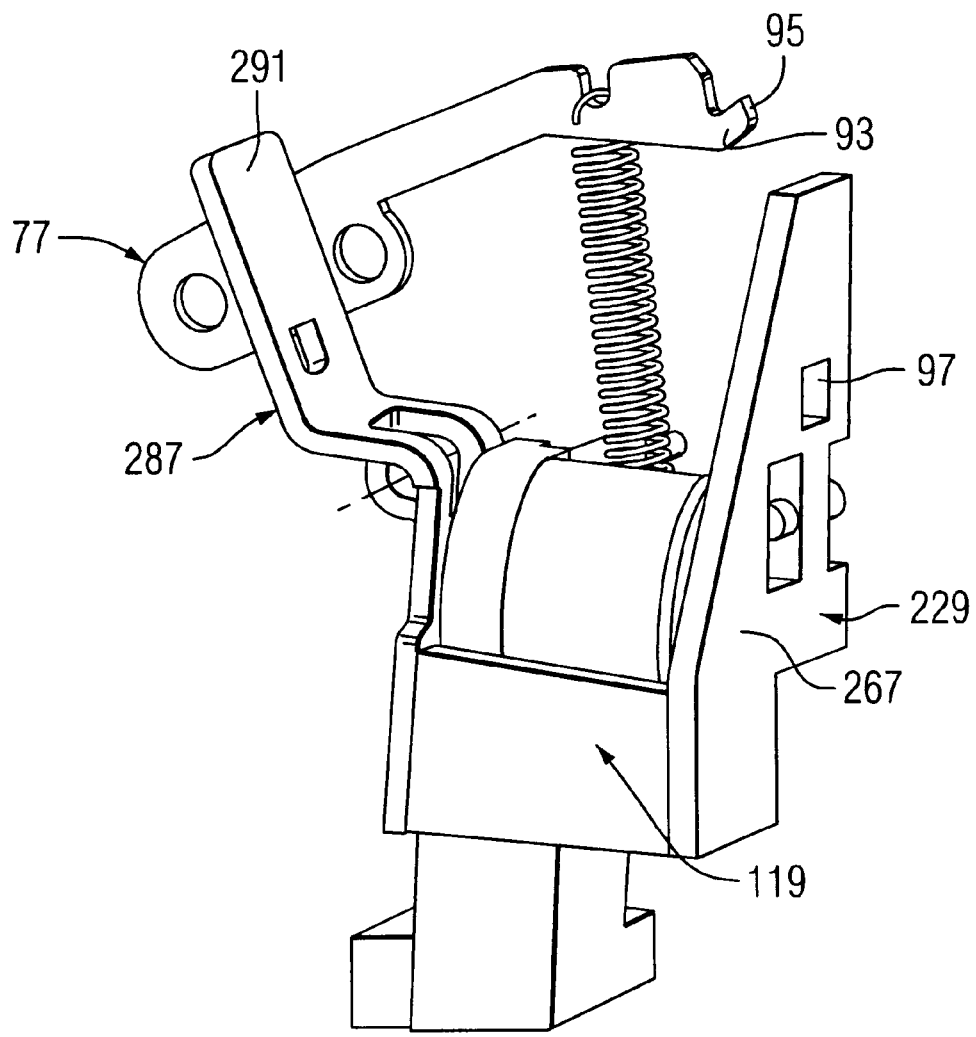
FIG. 15 is a view similar to FIG. 14 but showing the dual trip, dual latch trip actuator in the unlatched position.

As can be seen from FIG. 5, the handle assembly 35 includes a handle member 87 having a stem 89. The drive link 83 of the toggle mechanism 49 is pivotally connected to the stem 89 by a pin 91. The handle member 87 is supported for reciprocal linear movement by the bezel 29. The latch lever 77 has a finger 93 terminating in a hook 95 (as best shown in FIGS. 14 and 15), which engages (FIGS. 3 and 4) an opening 97 in the latch assembly 51.

The exemplary circuit breaker 1 operates in the following manner. In the OFF position (FIG. 3), which is the toggle open position of the toggle mechanism 49, the handle member 87 is up with an indicator portion 99 of the stem 89 visible to indicate the OFF condition. The latch lever 77 is latched by engagement of its hook 95 by the opening 97 in the latch assembly 51. The main spring 63 has rotated the movable contact arm 58 counter-clockwise (with respect to FIG. 3) against a stop portion 101 of the mechanism plate 23 so that the separable contacts 59 are open.

Depressing the handle member 87, which moves linearly downward to the position shown in FIG. 4, turns ON the circuit breaker 1. The drive link 83 pushes the knee pin 81 downward and to the right, and the first toggle link 65 downward, which results in clockwise rotation (with respect to FIGS. 3 and 4) of the movable contact arm 58 against the main spring 63. As the upper end of the second (upper) toggle link 71 is held stationary by the latch lever 77, the toggle mechanism 49 in general, and the first (lower) link 65 in particular, seats against a stop portion 103 of the mechanism plate 23 in the toggle closed position shown in FIG. 4. This latter motion occurs through clockwise rotation (with respect to FIG. 4) of the contact arm 58, which is pivotally mounted on the pin 61 at the slotted aperture 105 thereof. With the separable contacts 59 closed in this manner, the main spring 63 provides contact pressure on the separable contacts 59 and accommodates for wear.

The circuit breaker 1 may be manually opened from the ON position (FIG. 4) to the OFF position (FIG. 3) by raising the handle member 87. Initially, a downward force is applied to the contact arm 58 through the first toggle link 65. However, when the knee pin 81 passes through the center line between the pins 91 and 75, the toggle mechanism 49 breaks and the main spring 63 rotates the movable contact arm 58 counter-clockwise (with respect to FIGS. 3 and 4) until it seats against the stop 101 with the separable contacts 59 open. In turn, the handle 87 rises to the OFF position (FIG. 3).

As discussed below in connection with FIGS. 7 and 12 (persistent overcurrent conditions), FIGS. 13–15 (arc fault conditions), and FIGS. 3–6 (instantaneous trip conditions), the circuit breaker 1 can be tripped (FIG. 5) to the open condition under various conditions. Regardless of such conditions, the latch assembly 51 releases the latch lever 77, which is driven clockwise (with respect to FIGS. 4 and 5)

about the pin 79. Also, the movable contact arm 58 is driven counter-clockwise (with respect to FIGS. 4 and 5) through the main spring 63 to open the separable contacts 59.

In this transitory trip position, the handle member 87 is down, the latch lever 77 is rotated clockwise, and the movable contact arm 58 is in the open position. From this position, the handle spring 36 returns the handle member 87 to the OFF position and the latch lever spring 85 rotates the latch lever 77 counter-clockwise to a position where it can be engaged by the latch assembly 51. This is the OFF position.

The lower end of the handle spring 36 engages an inside surface (not shown) of the bezel 29. The inside of the bezel 29 forms a cup (not shown), with a relatively small hole (not shown) in the center thereof. That hole is of sufficient size, in order to permit the relatively small end 199 of the handle 35 to pass therethrough. The handle spring 36 biases the handle 35 in the direction away from the bezel 29, in order to drive the handle to the OFF position. In the ON position (FIG. 4), links 65,71 have passed straight alignment (and, thus, have passed the toggle position), and the main spring 63 prevents the handle 35 from opening. The forces of the main spring 63 and the handle spring 36 are predetermined in order that the main spring 63 prevents the handle spring 36 from opening the circuit breaker 1. If the circuit breaker 1 is tripped (FIG. 5), then the main spring 63 drives the movable contact arm 58 to the stop 101, and the force of the main spring is no longer involved in the force balance. Hence, the handle spring 36 can then move the handle 35 to the OFF position. Otherwise, when the circuit breaker 1 is ON and a user pulls on the handle 35, that force is added to the handle spring force until there is sufficient force to overcome the main spring force and open the circuit breaker.

Referring to FIGS. 1 and 6, there are five exemplary electrical connections to the PCB 41. Additional pins (not shown) electrically interconnect the PCBs 41,43. Two terminals 109,111 pass through openings 112,114 of the insulator 45 and electrically connect mating terminals 113,115, respectively, of the PCB 41 to a coil assembly 117 of a trip motor or electromagnet assembly 119 (e.g., a solenoid of FIGS. 12 and 13. Another two terminals 121,123 pass through openings 124,126 of the insulator 45 and electrically connect mating terminals 125,127, respectively, of the PCB 41 across the series combination of a bimetal 129 and the mechanism plate 23, in order to sense current flowing to the load terminal 33. The terminal 121 is electrically connected to the load terminal 33 and to one end (164 as best shown in FIG. 7) of the bimetal 129. The other terminal 123 is electrically connected to the mechanism plate 23, which is electrically connected to the other end (165 as best shown in FIG. 7) of the bimetal 129.

The electronic circuit (not shown) of the PCBs 41,43 measures the voltage between the terminals 125,127 and calculates the circuit breaker load current from the known resistance (e.g., about 5 to 100 milliohms depending on rated current) of the series combination of the bimetal 129 and mechanism plate 23 (i.e., I=V/R). In turn, the electronic circuit determines if an arc fault condition is present and, if so, energizes the terminals 113,115, in order to energize the coil assembly 117 and effect an arc fault trip (as discussed below in connection with FIGS. 13–15). A fifth terminal 131 (FIGS. 1–5), which is electrically connected to the bezel 29, passes through opening 132 of the insulator 45 and is electrically connected to mating terminal 133 of the PCB 41, in order to provide a suitable external ground reference thereto. The PCBs 41,43 derive power from voltage between the terminals 123,131. Whenever a suitable voltage is present, the PCBs 41,43 illuminate a light emitting diode (LED) 135 (FIG. 1), which is employed in connection with the arc fault indicator 37, as shown near the bottom of the bezel 29 of FIG. 3.

As shown in FIGS. 1 and 6, the terminals 109 and 111 pass through corresponding openings 137 and 139, respectively, of mechanism top plates 24,25, without electrically contacting those plates. The mechanism top plates 24,25 are held in place by three rivet pins 141, 143 and 145 formed on the metal pin 79, the metal pin 61, and a metal pin 147 (as best shown in FIG. 3), which holds the bottom end of the spring 85, respectively. In turn, the rivet pins 141, 143,145 engage the mechanism top plates 24,25 at corresponding openings 149,151,153, respectively, thereof. The pin 123, which is electrically connected to the mechanism plate 23, electrically engages the top plates 24,25 at the opening 155. Another opening 157 of the top plates 24,25 pivotally supports a pivot point 159 of the latch assembly 51.

The exemplary top plates 24,25 have a similar, but non-identical shape, with the first top plate 24 being cut away in some areas in order to maintain clearance for certain moving parts of the operating mechanism 22, and the second top plate 25 adding thickness to the first top plate 24 and providing an L-shaped portion 160 for the instantaneous (magnetic) trip function as discussed below in connection with FIGS. 3–6. Preferably, the plates 24,25 are initially formed from the same die.

FIG. 7 shows the load terminal 33, an overcurrent assembly 161 which includes the bimetal 129, the mechanism plate 23, the movable contact arm 58, the separable contacts 59 and the line terminal 32 of the circuit breaker 1 of FIG. 1. The bimetal 129 has two leg portions 162,163 and is fixed and electrically connected at one end or a first foot 164 to the load terminal 33. The other bimetal end or a second foot 165 engages and is electrically connected to the mechanism plate 23, which, in turn, is electrically connected to the movable contact arm 58 by a pigtail, such as flexible braided conductor 167, which is suitably electrically attached (e.g., by welding) at each end. In this manner, the load current flows from the line terminal 32 to the fixed contact 55, to the movable contact 57, to the movable contact arm 58, to the braided conductor 167, and to the mechanism plate 23, before passing through the bimetal 129 and to the load terminal 33. In the exemplary embodiment, the bimetal 129 is designed for 2.5 A rated load current, although the invention is applicable to a wide range of rated currents (e.g. 15 A or greater). The load current causes $I^2R$ heating of the bimetal 129 resulting in movement of its upper portion (with respect to FIG. 7) to the right side of FIG. 7, with all of the exemplary load current flowing through the bimetal 129. A 15 A bimetal, for example, is U-shaped, and has almost three times the cross section of the exemplary bimetal 129, and can carry more current without fusing.

The exemplary bimetal 129 includes an intermediate U-shaped section 169, which is electrically connected in series between the first leg 162 and the first foot 164 and the second leg 163 and the second foot 165. As discussed below in connection with FIG. 12, the bimetal 129 deflects in response to selected conditions of load current flowing through the separable contacts 59 to actuate the latch assembly 51. Hence, the bimetal 129 is responsive to selected conditions (e.g., overload, fault current conditions) of such load current and actuates the operating mechanism 22 through the trip latch 229 (FIG. 12) in order to trip open the separable contacts 59.

The exemplary mechanism plate 23 provides improved support for the bimetal 129 since the second foot 165 of the bimetal 129 is attached to the plate 23. This provides improved routing of current through the bimetal 129 from the separable contacts 59, to the movable contact arm 58, to the conductor 167, to the plate 23, and to the bimetal foot 165, which is attached to the plate 23. Furthermore, this provides a simpler routing of the conductor 167 (i.e., from the plate 23 to the movable contact arm 58), rather than from the bimetal foot 165 or leg 163 to the movable contact arm 58).

Figure 8:
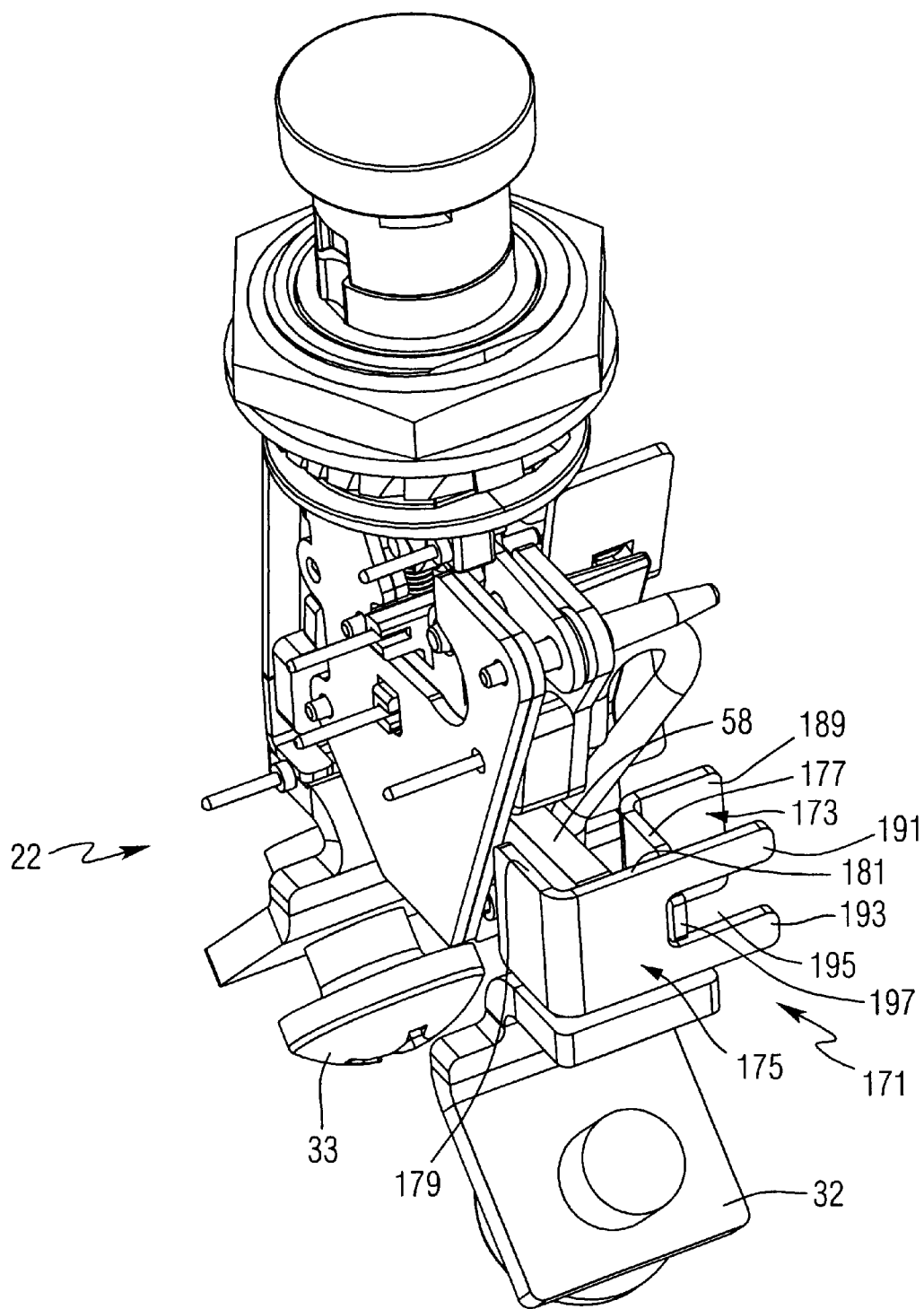
FIG. 8 is an isometric view of the operating mechanism and bonnet of the circuit breaker of FIG. 1.
Figure 9:
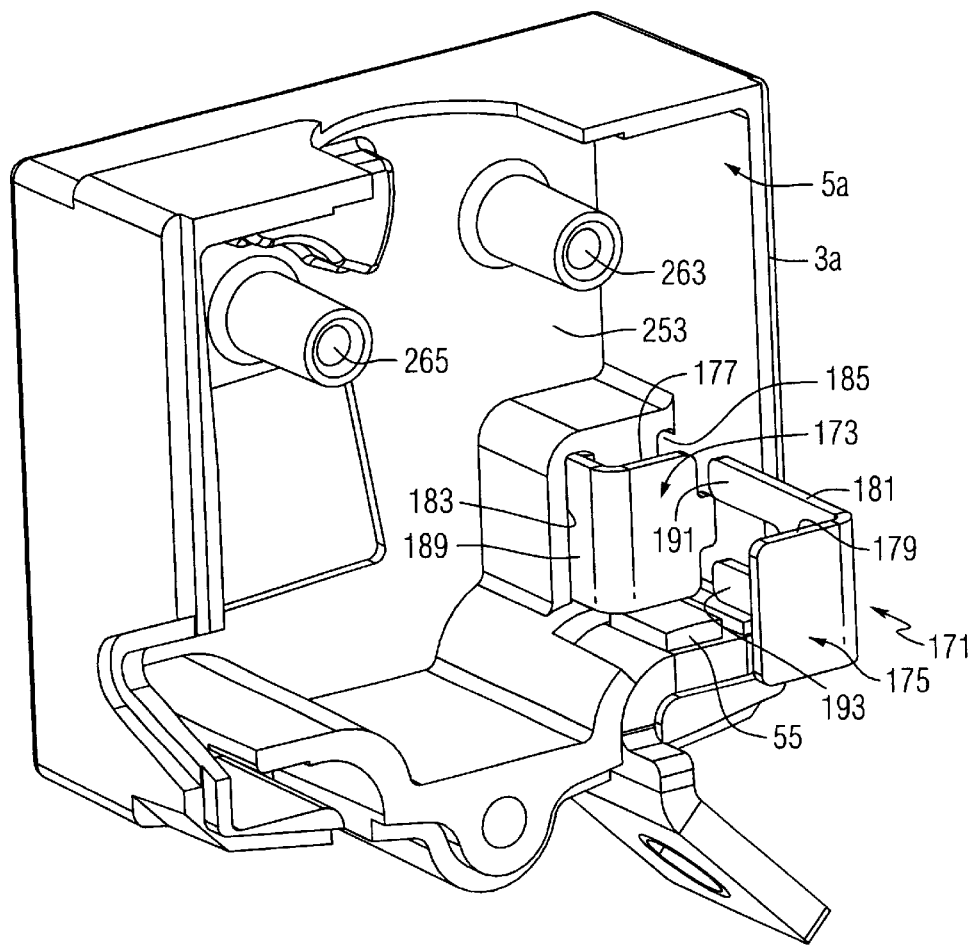
FIG. 9 is a partially exploded isometric view of the molded case and bonnet of the circuit breaker of FIG. 1 showing z-axis assembly of the bonnet.

Referring to FIGS. 8 and 9, a bonnet assembly 171 for the separable contacts 59 of FIG. 4 is shown. The bonnet assembly 171 includes two metal (e.g. made of steel) pieces 173,175, each having an L-shape, of which the first piece 173 forms a first leg 177 of the assembly 171, and the second piece 175 forms a second leg 179 and a base 181 of the assembly 171, in order to form a U-shape, which surrounds the separable contacts 59 and which cools and splits an arc when the operating mechanism 22 trips open the separable contacts 59. The molded case 3a (FIG. 9) includes two slots 183,185 therein. The exemplary first piece 173 has a tab 189, which engages the slot 183. The exemplary second piece 175 has two exemplary tabs 191,193, which engage the slot 185 of the molded case 3a. Although the exemplary bonnet assembly 171 has a generally rectangular U-shape, the invention is applicable to bonnet assemblies having a rectangular or a rounded U-shape.

The exemplary U-shape (as best shown in FIG. 8), as formed by the bonnet assembly 171, has the first leg 177 formed by the first L-shaped piece 173, the base 181 formed by the second L-shaped piece 175, and the second leg 179 formed by the second L-shaped piece 175. The second L-shaped piece 175 has a notch 195 between the two tabs 191,193 thereof. The first L-shaped piece 173 has an end 197, which rests in the notch 195 between the tabs 191,193 of the second L-shaped piece 175. The other end of the first L-shaped piece 173 has the tab 189, which engages the slot 183. The tabs 189 and 191,193 of the respective first and second L-shaped pieces 173 and 175 mount the bonnet assembly 171 to the molded case 3a and, thus, advantageously permit z-axis assembly of that assembly 171, with the initial insertion of the first L-shaped piece 173 being followed by subsequent insertion of the second L-shaped piece 175.

Figure 10:
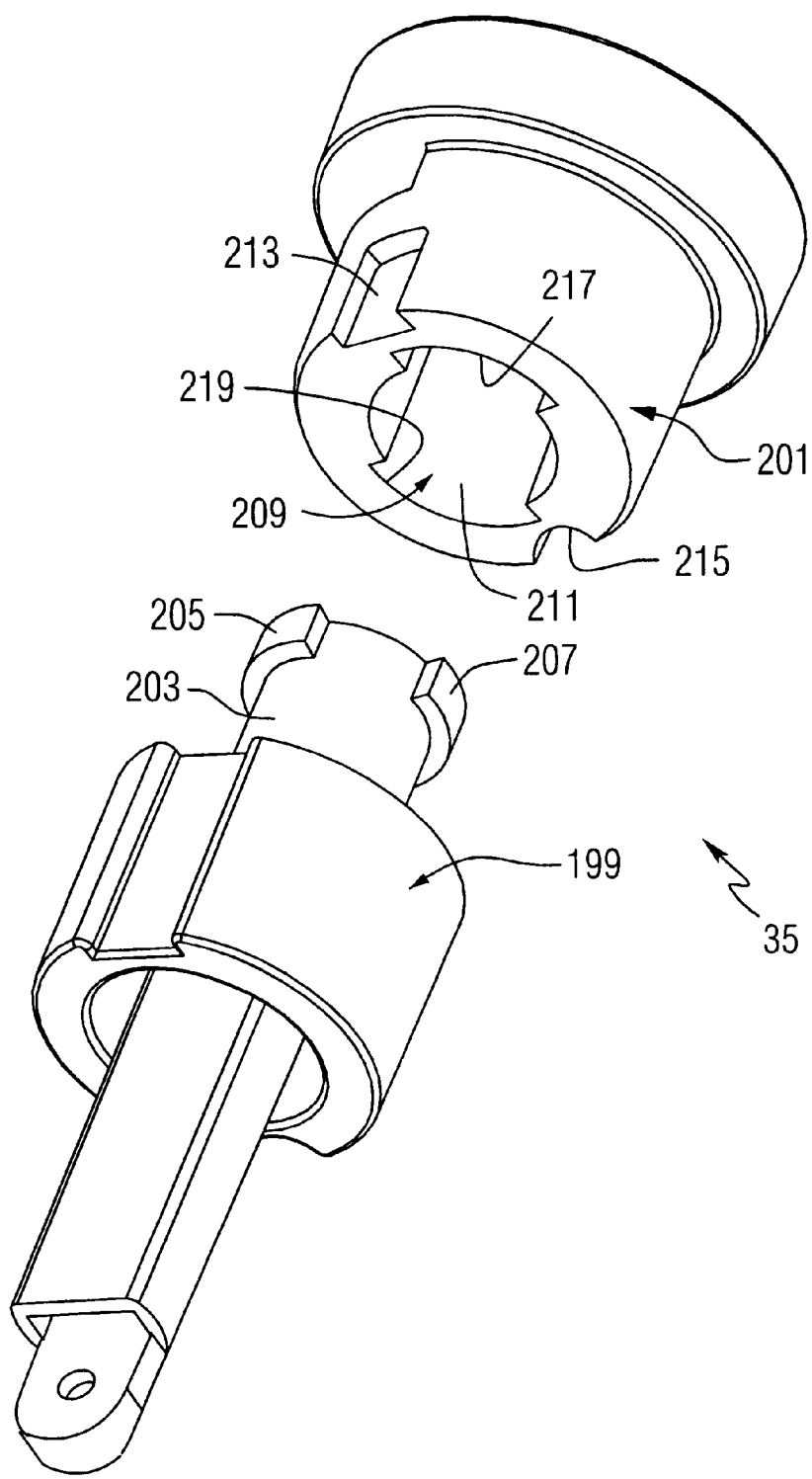
FIG. 10 is an exploded isometric view of two parts of the handle assembly of the circuit breaker of FIG. 1.
Figure 11:
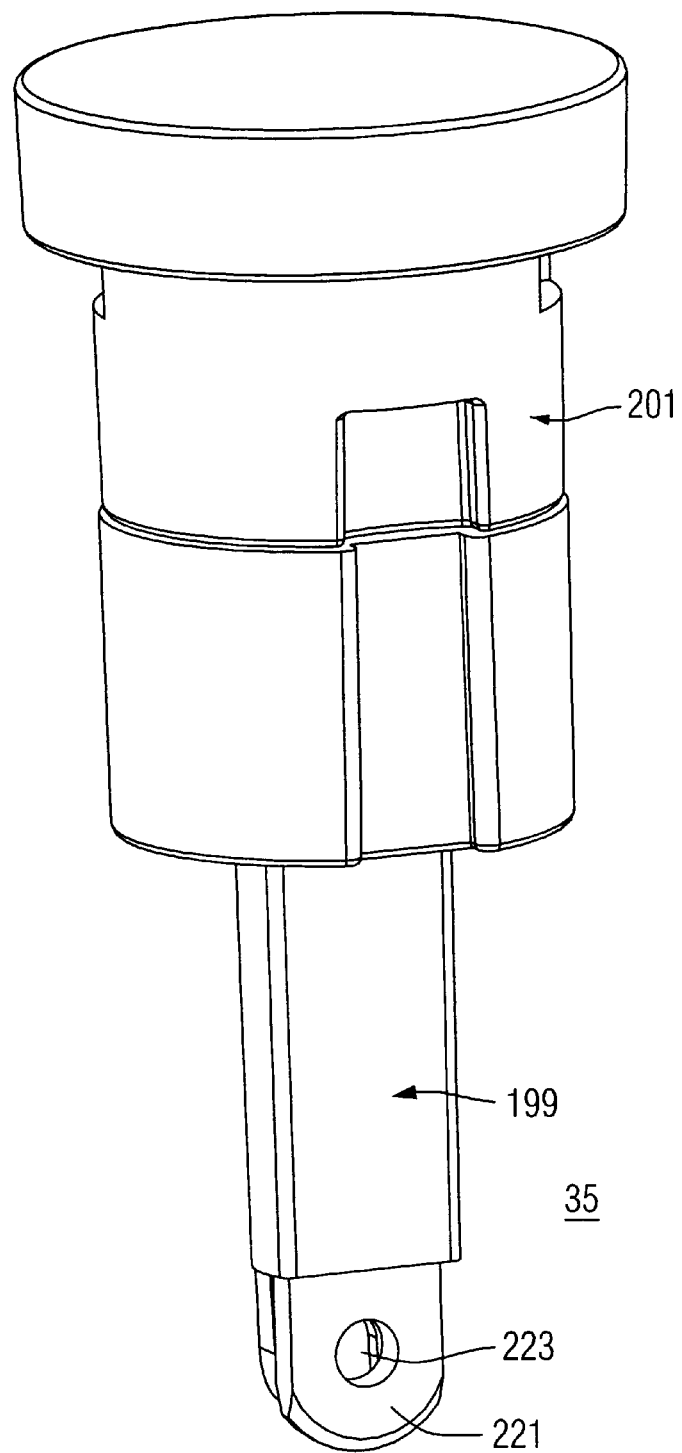
FIG. 11 is an isometric view of the assembled handle assembly of FIG. 10.

FIGS. 10 and 11 show the handle assembly 35 of the circuit breaker 1 of FIG. 1. The handle assembly 35 includes a first piece or stem portion 199, and a second piece or cap portion 201. In the exemplary embodiment, the stem portion 199 is made of molded plastic having a light (e.g., white) color, and the cap portion 201 is made of molded plastic having a dark (e.g., black) color. As shown in FIG. 11, the stem portion 199 is secured to the cap portion 201, with the stem portion 199 providing a first visual impression and the cap portion 201 providing a different second visual impression.

As shown in FIG. 4, the stem portion 199 is internal to the cavity 3a of the housing 3 (FIG. 1) when the separable contacts 59 are closed, and the cap portion 201 is external to the housing 3, thereby providing a first visual impression (e.g., the dark color of the cap portion 201) in the handle ON position. Otherwise, as shown in FIGS. 3 and 5, the indicator portion 99 of the stem portion 199 of the handle assembly 35 is external to the housing 3 when the separable contacts 59 are open (i.e., OFF, tripped open). As shown in FIG. 10, the stem portion 199 has a stem 203 with two ears or protrusions 205,207 at each side of the upper (with respect to FIG. 10) end thereof. The cap portion 201 has an open end 209 and an annular wall 211 with two openings 213,215 therein. The annular wall 211 also has two channels 217,219 therein, which channels are offset from the two openings 213,215, respectively. When the handle assembly 35 is assembled, the stem 203 of the stem portion 199 is inserted into the open end 209 of the cap portion 201, with the ears 205,207 being in the channels 217,219 of the annular wall 211. Then, the cap portion 201 is rotated clockwise (with respect to FIG. 10) by an exemplary one-quarter turn, in order to engage the ears 205,207 in the openings 213,215, respectively, thereby locking the two portions 199,201 together as shown in FIG. 11. In this manner, the handle assembly 35 provides two-piece snap together construction and does not rotate apart. Hence, this provides an operating handle or button with sufficient strength and, also, provides a clear indication through the distinctly different visual impressions of the two molded portions 199,201, in order to show breaker status (i.e., OFF/tripped versus ON).

Although the exemplary embodiment employs different colors in order to provide distinct different visual impressions of the two portions 199,201, the invention is applicable to a wide range of such portions that provide distinctly different visual impressions by, for example, distinct textures (e.g., smooth vs. rough), distinct patterns (e.g., a lined vs. a checked pattern, striped vs. solid), and/or distinct combinations thereof (e.g., a solid blue color vs. a striped pattern). Although a two-piece handle assembly 35 is shown, the invention is applicable to single- and plural-piece operating handles which preferably include distinct visual impressions in order to show breaker status.

The stem portion 199 is preferably molded to include a metal (e.g. made of stainless steel) insert 221 having an opening 223 to receive the pin 91 of FIG. 4.

Figure 12:
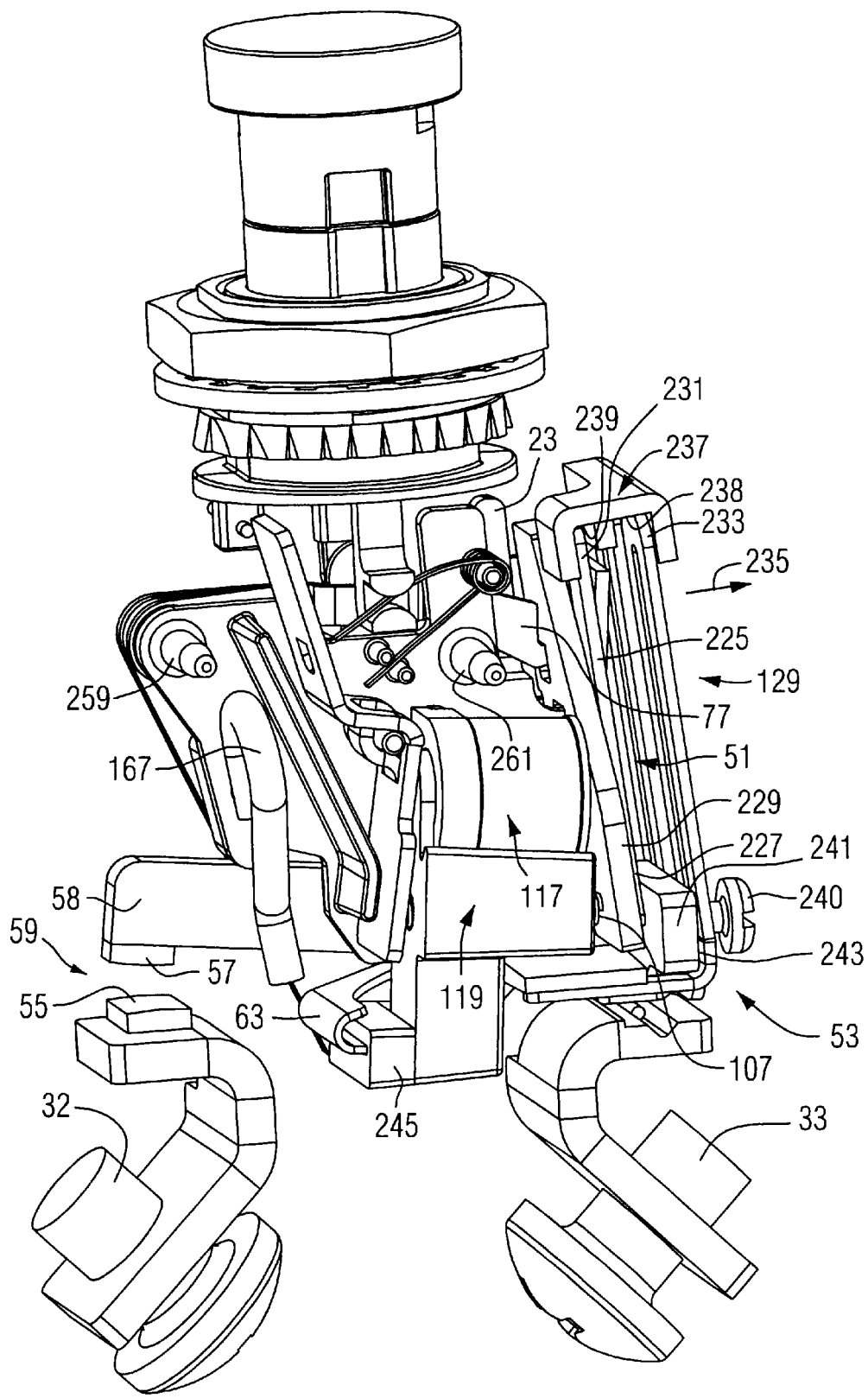
FIG. 12 is an isometric view of the trip motor, dual latch trip actuator and bimetal of the circuit breaker of FIG. 1.

FIGS. 12 shows the overcurrent assembly 53 including the trip motor or electromagnet assembly 119 and the bimetal 129. A cantilevered ambient compensation bimetal 225 is operatively associated with the bimetal 129. One end 227 of this ambient compensation bimetal 225 is suitably fixed to a trip latch member 229 of the latch assembly 51, such as by spot welding. The cantilevered ambient compensation bimetal 225 extends upward (with respect to FIG. 12) to terminate in a free end 231, which is adjacent to a free end 233 of the bimetal 129. Under normal operating conditions, there is a gap between the free end 233 of the bimetal 129 and the free end 231 of the ambient compensation bimetal 225. When the bimetal 129 is heated, it moves to the right (with respect to FIG. 12) as shown by line 235. An exemplary shuttle 237 made of plastic or some other suitable insulating material has notches 238 and 239, which engage the free ends 233 and 231 of the bimetal 129 and the ambient compensation bimetal 225, respectively. The bimetal 129, when heated, moves the shuttle 237, thus, pulling on the ambient compensation bimetal 225, which, in turn, is attached to the trip latch 229. An increase or decrease in ambient temperature conditions cause the free end 233 of the bimetal 129 and the free end 231 of the ambient compensation bimetal 225 to move in the same direction and, thereby, maintain the appropriate gap between the two bimetal free ends 231,233, in order to eliminate the effects of changes in ambient temperature. Hence, the bimetal 129 and the cantilevered ambient compensation bimetal 225 are coupled in series to the trip latch 229 to move the same in response to a persistent overcurrent condition as compensated for ambient conditions. Under overcurrent conditions, the bimetal 129, therefore, pulls on the ambient bimetal 225, which rotates the trip latch 229 of the latch assembly 51 clockwise (with respect to FIG. 12, or counter-clockwise with respect to FIG. 6) around the pivot point 159 (FIG. 6) and releases the latch lever 77 to trip the operating mechanism 22.

The thermal trip can be calibrated by a calibration screw 240, which engages the molded case 3a of FIG. 2 and which is threaded into a nut 241 disposed between a lower surface 243 of the bimetal 129 and the fixed end 227 of the ambient compensation bimetal 225. By further threading and tightening the screw 240 into the nut 241, the nut 241 engages the lower bimetal surface 243 and drives the bimetal free end 233 to the right (with respect to FIG. 12) as shown by line 235. Alternatively, reversing the screw 240 out of the nut 241, allows the bimetal free end 233 to return to the left (with respect to FIG. 12).

Figure 13:
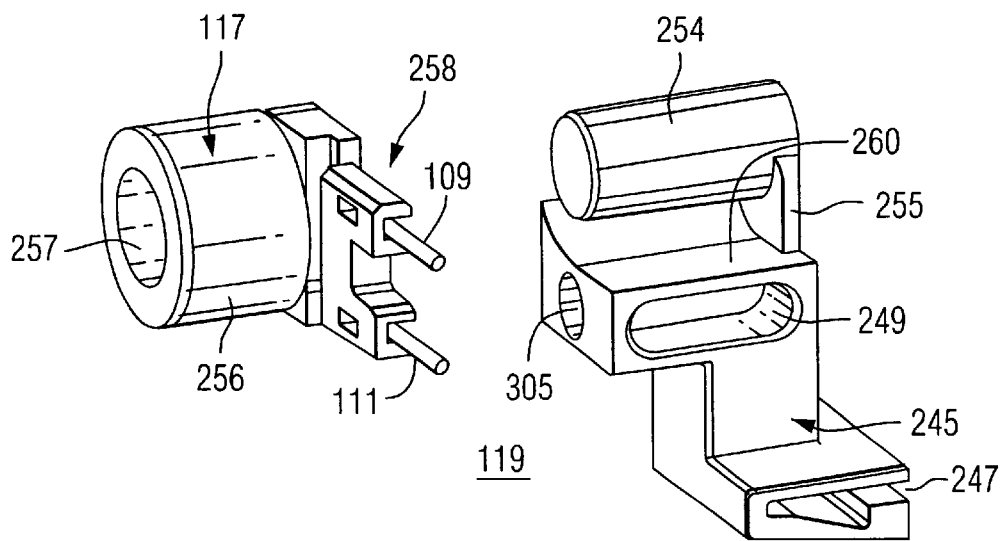
FIG. 13 is an exploded isometric view of the trip motor of FIG. 12.

As shown in FIG. 13, the trip motor assembly 119 includes a motor base 245 made of magnetic steel, the coil assembly 117, and the terminals 109,111. The base 245 includes an opening 247, which fixedly engages one end of the spring 63 of FIG. 3, and also includes an exemplary oval hole 249 therein, which hole mates with a corresponding oval protrusion feature 251 in the mechanism plate 23 of FIG. 7 for location of the motor assembly 119. In turn, the motor assembly 119 is secured between the back wall 253 of the molded case 3a of FIG. 9 and the mechanism plate 23.

The exemplary motor coil assembly 117 has a magnetically permeable motor core 254 which fits inside a coil sleeve (not shown) within an electrical coil 256. The motor core 254 is connected at one end 255 to the base 245. The coil assembly 117 is housed in a magnetically permeable motor cup 260, which together with the magnetically permeable core 254, form a magnetic circuit. The motor core 254 holds the coil 256 within an opening 257 thereof. A pin or terminal holder 258 projects laterally outward through a slot (not shown) in the motor cup 260 and supports the terminals 109,111. The trip motor coil assembly 117 is energized through the terminals 109,111 by an electronic trip circuit (e.g., arc fault, ground fault) provided on the PCBs 41,43 of FIG. 1. In the exemplary embodiment, only an arc fault trip circuit is provided.

The exemplary circuit breaker 1 includes three different trip modes, all of which employ the trip latch 229 of FIG. 4 to actuate the operating mechanism 22 and trip open the separable contacts 59: (1) overcurrent conditions (i.e., thermal trip) detected by the bimetal 129 (FIGS. 7 and 12), which actuates the trip latch 229 through the shuttle 237 and ambient compensation bimetal 225; (2) arc fault (and/or ground fault) conditions detected by the PCBs 41,43, which energize the trip motor 119 to actuate the trip latch 229 (FIGS. 14 and 15); and (3) relatively high current conditions (i.e., instantaneous trip), which also attract the trip latch 229 (FIGS. 3–6).

As shown in FIG. 12, the mechanism plate 23 has two posts 259,261, which engage corresponding holes 263,265, respectively, within the cavity 5a of the molded case 3a (FIG. 9). Preferably, the posts 259,261 and holes 263,265 provide an alignment function, with the insulator 45, PCBs 41,43 and molded cover 3b, as secured by the clip plate 7, holding the operating mechanism 22, mechanism plate 23 and trip motor 119 within the housing 3 of FIG. 1.

Referring to FIGS. 14 and 15, the motor coil 256 is fixedly held by the motor core 254 of FIG. 13, with one end of the coil 256 (and, thus, one end of the motor core 254) facing an armature section 267 of the trip latch 229. When the coil assembly 117 is energized, the trip latch armature section 267 is attracted toward the motor core, thereby rotating the upper portion 269 right (with respect to FIG. 14) to an unlatched position. As discussed above in connection with FIG. 5, actuation of the trip latch 229 trips open the separable contacts 59. Hence, for protection against arc faults, the electronic trip circuit of the PCBs 41,43, which is responsive to selected arc fault conditions of current flowing through the separable contacts 59, monitors the load current (i.e., through terminals 121,123 of FIG. 6) for characteristics of such faults, and energizes (i.e., through the terminals 109,111 of FIG. 6) the trip motor coil assembly 117. In turn, the magnetic flux generated by the energization of the coil assembly 117 attracts the trip latch armature section 267 toward the motor core (as shown in FIG. 15), in order to slide the hook 95 out of the trip latch opening 97, thereby tripping the circuit breaker 1 open in the manner discussed above for a thermal trip.

Figure 16:
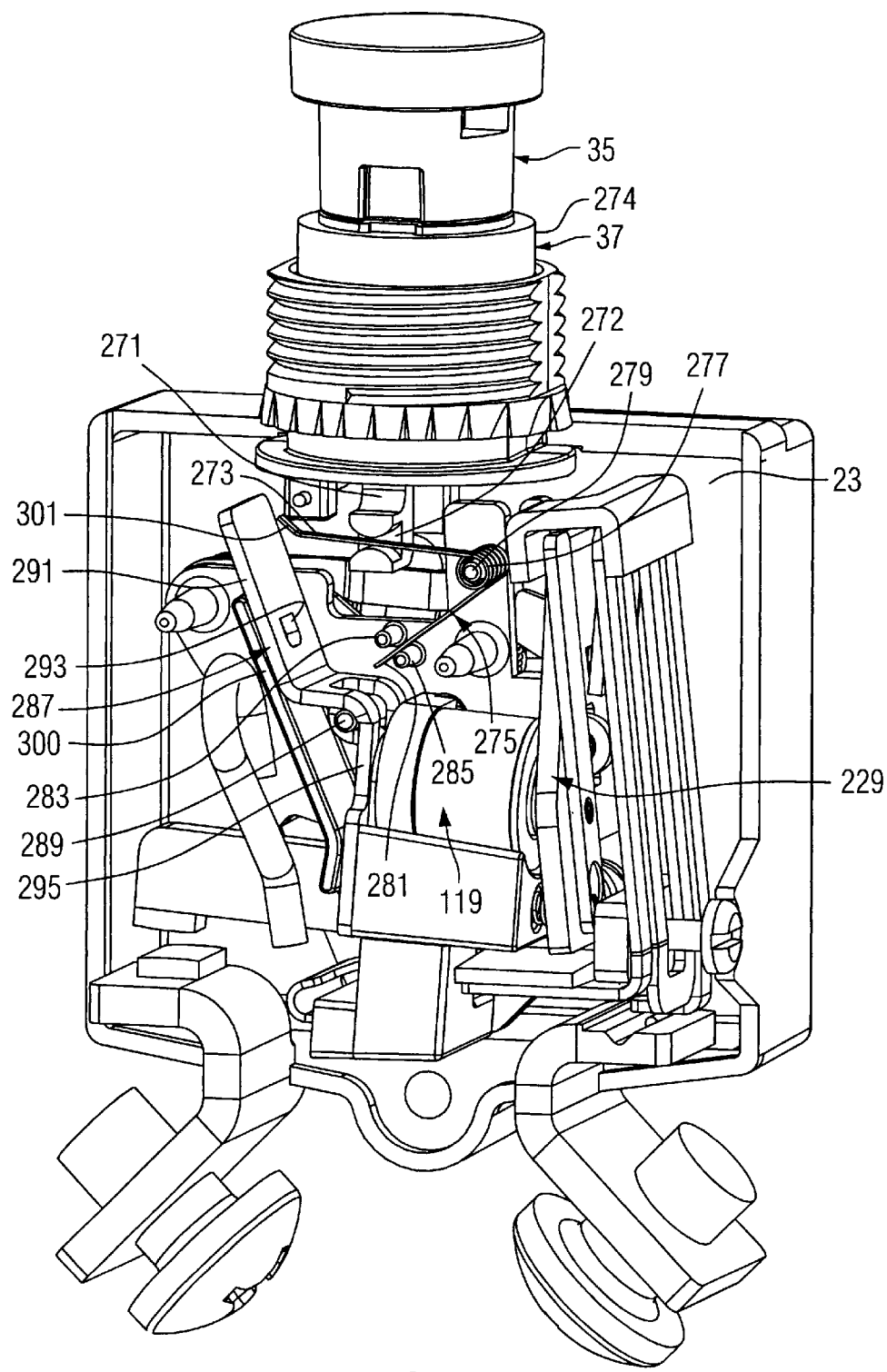
FIG. 16 is an isometric view of the operating handle assembly, the trip actuator and the arc fault indicator assembly of the circuit breaker of FIG. 1, with the cover and some internal portions thereof not shown for clarity.
Figure 17:
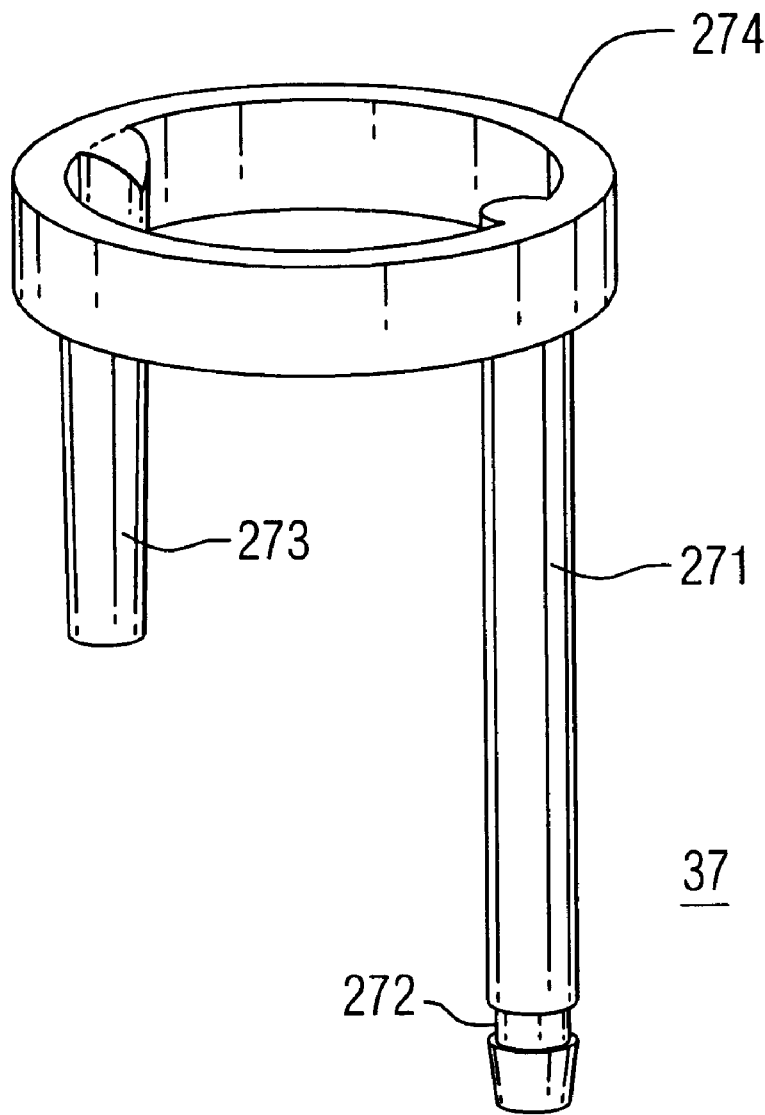
FIG. 17 is an isometric view of the arc fault indicator of FIG. 16.

FIG. 16 shows the operating handle assembly 35 in the raised OFF position (of FIG. 3), and the movable and illuminable arc fault indicator 37 in a raised tripped position. The indicator 37 (as best shown in FIG. 17) includes a first leg or movable member 271 having a notch 272 near the lower end thereof. The notch 272 is engaged by a first arm 273 of a spring 275. The spring 275 has a central portion 277, which is held by a pin 279 on the mechanism plate 23, and a second arm 281, which is held between side-by-side pins 283,285 on the plate 23. The indicator 37 of FIG. 17 also includes a second leg or light pipe member 273 and an illuminable ring portion 274, which is connected to the legs 271,273. The illuminable ring portion 274 is a first portion of the movable and illuminable arc fault indicator 37, and the legs 271 and 273 are a second portion of the indicator 37, which is normally recessed within the bezel 29 of the housing 3 (FIGS. 3–5). Under normal operating conditions, the PCB 41 energizes the LED 135 (FIG. 1) from an internal voltage, which is derived from the normal line-ground voltage between the terminals 123,131 (FIGS. 1 and 6). The free end of the light pipe 273 is normally proximate the LED 135 (FIG. 3) and normally receives light therefrom when the arc fault PCBs 41,43 are properly energized. Hence, the LED 135 normally illuminates the light pipe 273 and, thus, the illuminable ring portion 274. The illuminable ring portion 274 is visible in FIGS. 3–5, in order to indicate, when lit, proper energization of the arc fault PCBs 41,43.

Referring to FIGS. 14 and 15, the trip motor 119 also includes an indicator latch 287, which is pivotally mounted on a pin 289 disposed on the mechanism plate 23 of FIG. 16. The indicator latch 287 includes an upper latch portion 291 having an opening 293 therein, and a lower armature portion 295. The indicator latch 287 is disposed at one end of the trip motor 119 and the trip latch 229 is disposed at the opposite end thereof. As shown in FIG. 14, there is a first gap 297 between the right (with respect to FIG. 14) end of the trip motor cup 260 and the trip latch armature 267, and there is a second gap 299 between the left (with respect to FIG. 14) end of the cup 260 and the indicator latch armature 295. In response to current applied to the coil assembly 117, the trip motor 119 creates flux and attracts one of the latches 229,287 thereto, which closes a corresponding one of the gaps 297,299, thereby lowering the reluctance of the coil assembly 117, increasing the trip motor flux, and attracting the other one of the latches 229,287, in order to close the other corresponding one of the gaps 297,299, as shown in FIG. 15. For example, it is believed that the trip motor 119 first attracts the indicator latch 287, which requires less actuation force than that required by the trip latch 229, although the invention is applicable to trip motors which first attract a trip latch, or which simultaneously attract indicator and trip latches.

Figure 18:
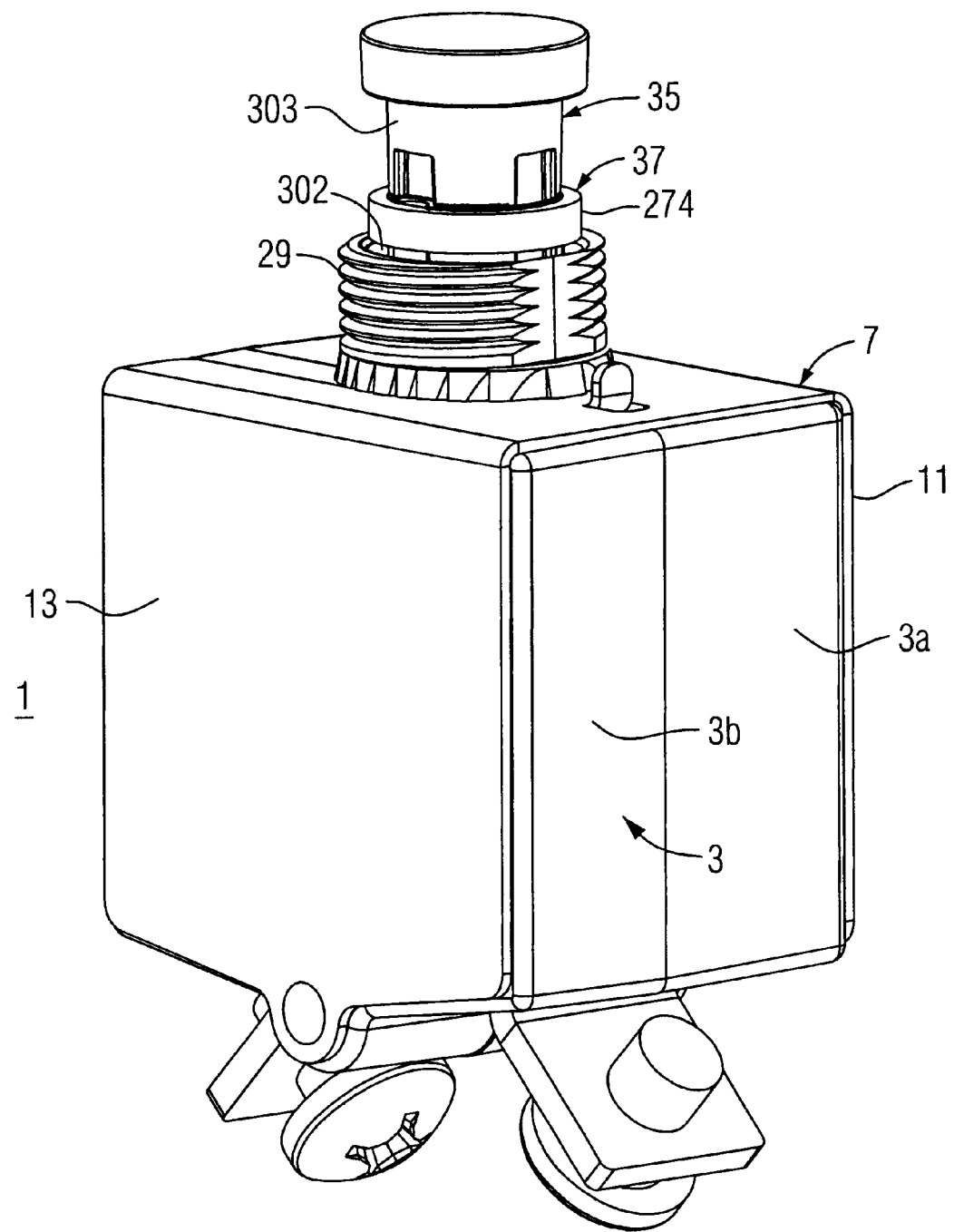
FIG. 18 is an isometric view of the circuit breaker of FIG. 1 with the handle in the trip position and the arc fault indicator assembly in the arc fault trip position.

With the indicator latch 287 in the position of FIG. 15, the end 301 of the spring leg 273 disengages from the indicator latch opening 293, and the spring leg 273 drives the movable member 271 upward with respect to FIG. 16, thereby driving the indicator ring 274 upward to the arc fault trip position of FIGS. 16 and 18. In that position, the light pipe 273 (FIG. 17) is separated from the LED 135 (FIG. 1). Also, power is removed to the PCBs 41,43. Hence, the illuminable ring portion 274 is no longer lit.

FIG. 18 shows the circuit breaker 1 with the operating handle assembly 35 in the handle trip position following an arc fault (and/or thermal and/or instantaneous) trip condition, and the indicator ring 274 disposed away from the housing 3 in the arc fault trip position following an arc fault trip condition. Normally, these positions result from an arc fault trip, although, as discussed below, may, alternatively, result from a previous arc fault trip, after which the operating handle assembly 35, but not the illuminable ring portion 274, was reset, followed by a thermal and/or instantaneous trip. The illuminable ring portion 274 protrudes through the opening 30 of the housing 3 of FIG. 1 and through an opening 302 of the bezel 29. The ring portion 274 surrounds an upper stem portion 303 of the operating handle assembly 35.

An important aspect of the present invention is the capability of the exemplary operating handle assembly 35 to operate independently from the arc fault indicator 37. In this manner, following any trip, the operating handle assembly 35 may be reset to the ON position of FIG. 4, without moving the arc fault indicator 37 from the arc fault trip indicating position of FIG. 18. For example, during aircraft operation, it may be highly advantageous during operation of a critical or important power system to re-energize such system through the operating handle assembly 35, while leaving the arc fault indicator 37 in its arc fault trip indicating position. In this manner, the aircraft may be safely operated (e.g., the risk of not energizing that power system outweighs the risk of an arc fault), while leaving the arc fault indicator 37 deployed for the subsequent attention by maintenance personnel only after the aircraft has safely landed. Similarly, the arc fault indicator 37 may be reset from the arc fault trip indicating position of FIG. 18 by pressing downwardly on the illuminable ring portion 274, in order to reengage the spring leg end 301 with the indicator latch opening 293 (FIG. 21), without moving the operating handle assembly 35 between the OFF and ON positions thereof.

FIG. 19 shows the normal operating condition of the circuit breaker 1 in which both the operating handle assembly 35 and the indicator ring 274 are in the normal positions. Also, as long as power is suitably applied to the circuit breaker 1, the illuminable ring portion 274 is normally lit by light from the LED 135 (FIG. 1) as energized by line-ground voltage between the terminal 123 (FIG. 6), which has the line voltage from the line terminal 32, and the terminal 131 (FIG. 4), which has the ground potential from the bezel 29 and/or a mounting panel (not shown)). Thus, the LED 135 is normally lit in the event that the arc fault PCBs 41,43 (FIG. 1) are energized and is, otherwise, not lit (e.g., power is not present; the bezel 29 is improperly grounded).

Figure 20:
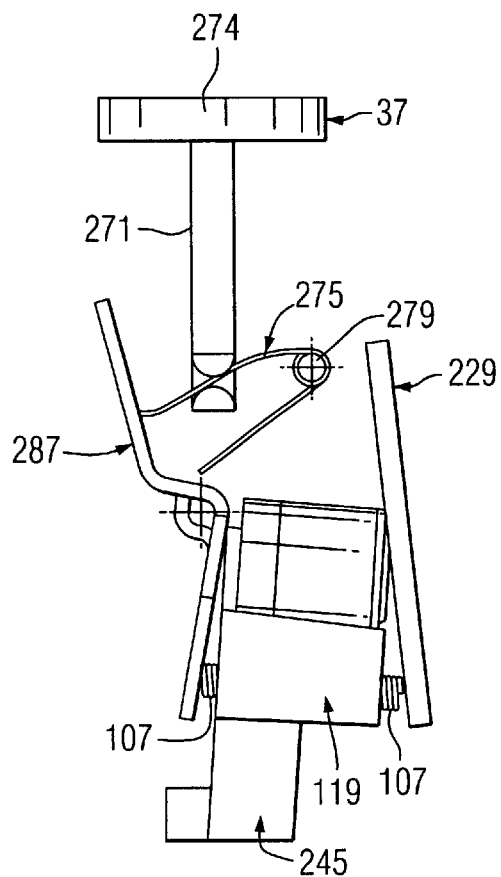
FIG. 20 is a front elevation view of the combined light pipe trip indicator ring and trip actuator of the circuit breaker of FIG. 1 in the latched position.
Figure 21:
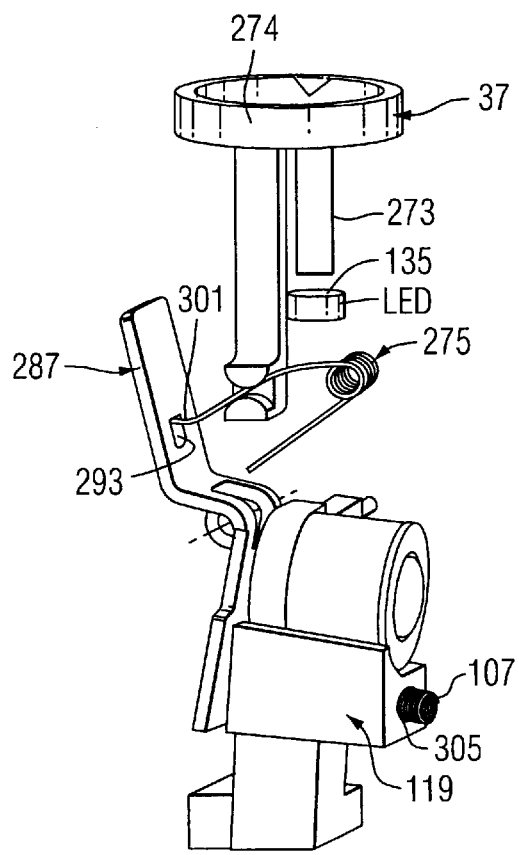
FIG. 21 an isometric view of the indicator ring and trip actuator of FIG. 20.
Figure 22:
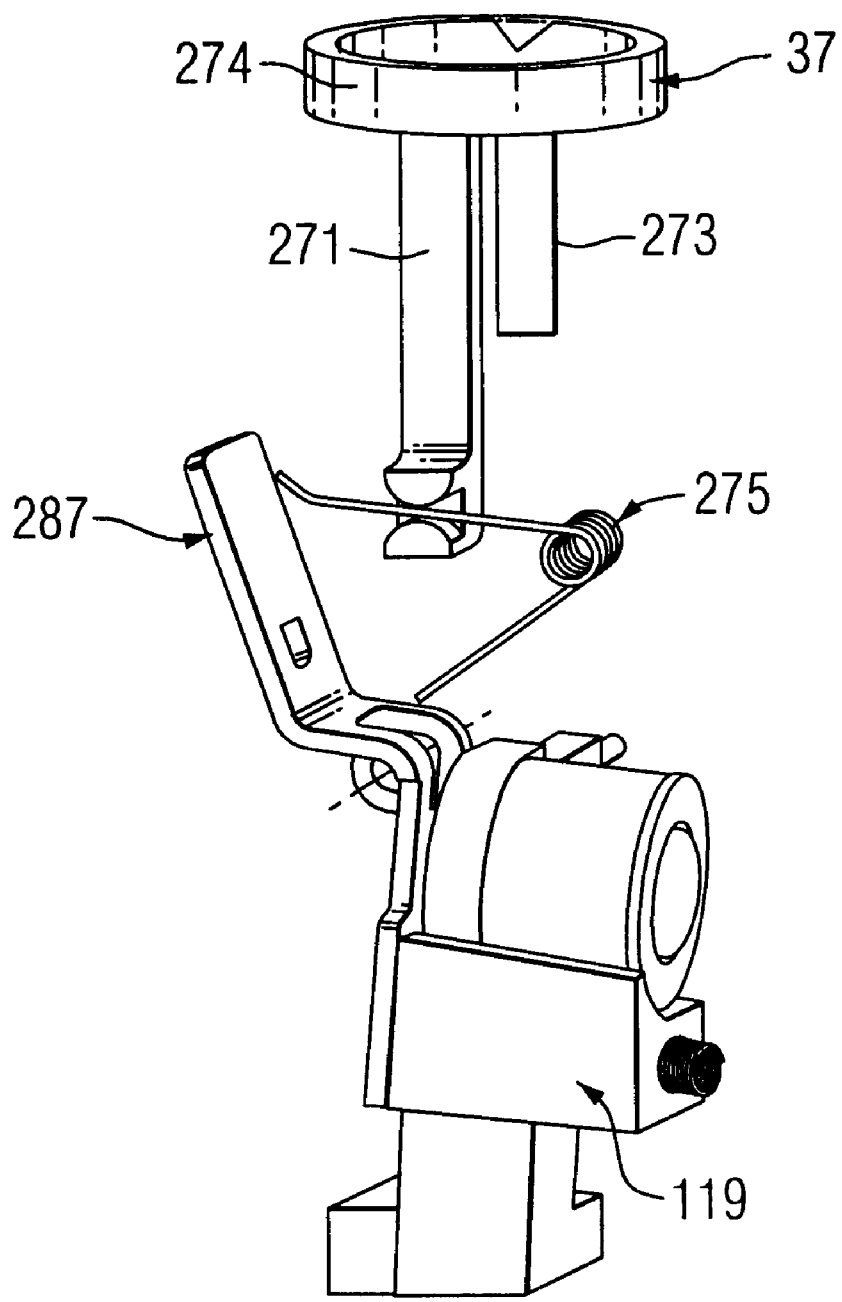
FIG. 22 is a view similar to FIG. 21 but showing the indicator ring and the trip actuator in the unlatched position.

Referring to FIGS. 20–22, the indicator leg 271 is engaged by the spring 275 and is mechanically held down by the indicator latch 287 (FIGS. 20 and 21). When an arc fault trip condition occurs, the indicator latch 287 is actuated to the position shown in FIG. 22. When the indicator latch 287 is so moved, the spring 275 is released from the indicator latch opening 293, which allows the spring 275 to push up the indicator leg 271 internal to the housing 3 of FIG. 1, thereby moving the indicator ring 274 away from and external to the housing 3 as shown in FIG. 18, in order to indicate an arc fault trip condition.

As shown in FIG. 20, the latch return spring 107 extends through an opening 305 of the motor base 245 (as best shown in FIG. 13). The spring 107 drives the indicator latch 287 clockwise and drives the trip latch 229 counter-clockwise (with respect to FIG. 20) and, thus, drives both of the dual latches 229,287.

Although the invention has been described in terms of a dual trip/indicator latch formed by the exemplary trip motor 119, the trip latch 229, and the indicator latch 287, the invention is applicable to single and dual latch functions which actuate an indicator latch, in order to indicate an arc fault or ground fault condition, and/or which actuate a trip latch, in order to trip open separable contacts. The invention is further applicable to an indicator latch, which normally engages a movable member of an indicator, and which releases such member for movement by a spring.

In order to provide an instantaneous trip, the overcurrent assembly 53 of FIGS. 3–5 includes an arrangement for routing a current path of a main conductor, as formed by the bimetal 129, the mechanism plate 23, the flexible braid 167 and the movable contact arm 58 of FIG. 7, through a magnetic circuit, as formed by the motor frame 245 of FIG. 12 and the two steel mechanism top plates 24,25 of FIG. 6. The motor frame 245 and plates 24,25 form a steel shape around this current path. The discontinuous electrical conduction paths of the exemplary magnetic circuit direct the magnetic flux to flow once through the general path of the steel shape, thereby forming a one-turn electromagnet. Whenever load current flows in the circuit breaker 1, the steel shape magnetically attracts the steel trip latch 229. The magnetic coupling is such that suitably high load currents of at least a predetermined magnitude (e.g., without limitation, about 300 A for a 2.5 A rated load), such as those associated with short circuits, are sufficient to actuate the trip latch 229, without energizing the trip motor coil assembly 117. If the load current is of sufficient magnitude, then the trip latch 229 is rotated in the counter-clockwise direction (with respect to FIG. 5), thereby tripping the circuit breaker 1.

For example, magnetic flux flows around any current carrying conductor and, preferably, flows in steel. Hence, the exemplary steel shape around the exemplary load current path concentrates and channels the magnetic flux to flow through the exemplary steel path. Although the magnetic flux preferably flows in the steel, it also crosses any gaps in such steel. Therefore, the top plates 24,25 are preferably close to the motor frame 245, although physical connection is not required. When the magnetic flux crosses a gap in its path around the discontinuous electrical conduction paths, a force is generated toward closing that gap. Hence, since the steel path encompassing those conduction paths includes gaps between the motor frame 245 and the trip latch 229, and between the L-shaped portion 160 of the top plate 25 and the trip latch 229, forces are generated toward closing those gaps and, thus, actuating the trip latch 229.

Figure 23:
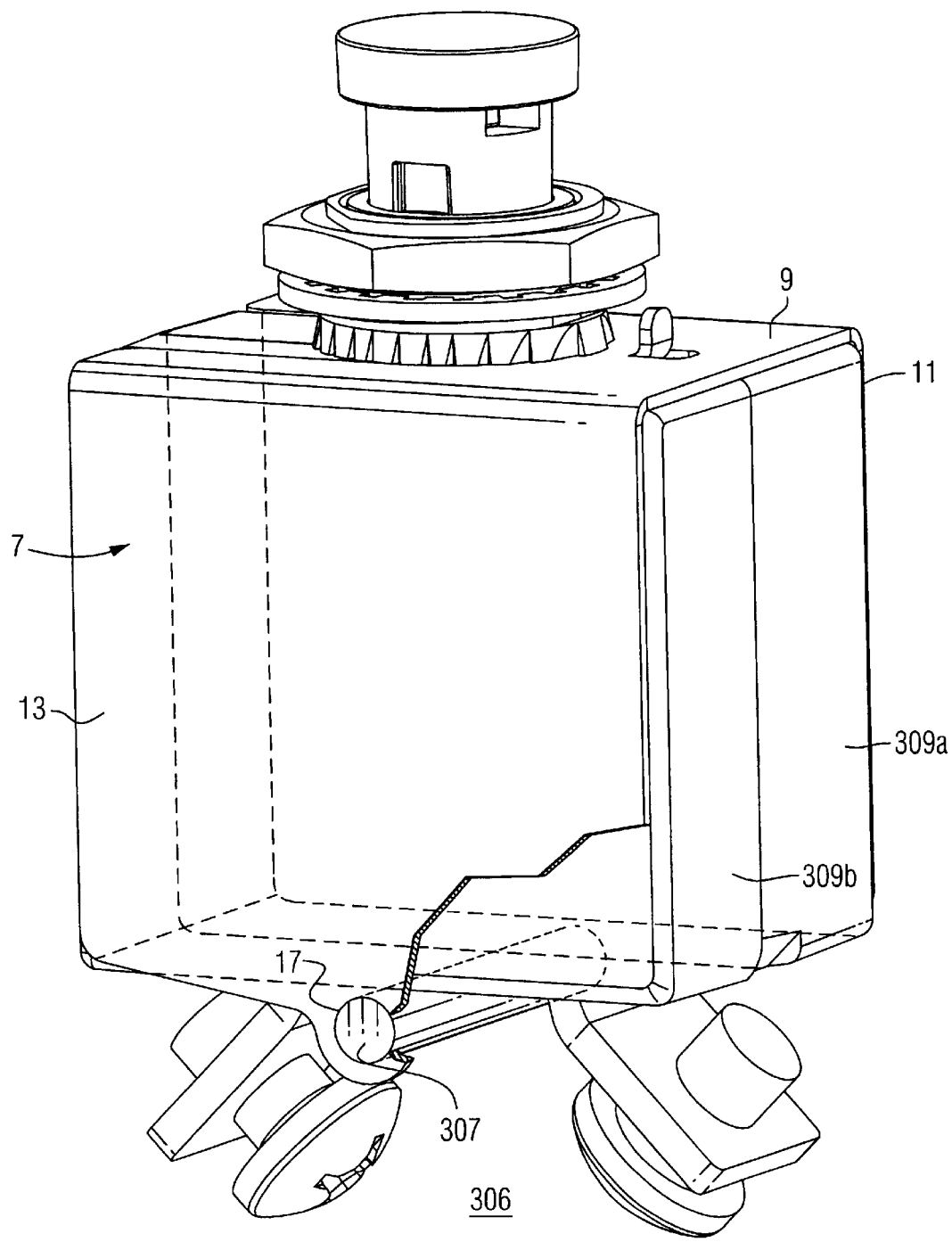
FIGS. 23 and 24 show other circuit breakers including housings in accordance with alternative embodiments of the invention.

As shown in FIG. 23, a circuit breaker 306 is similar to the circuit breaker 1 of FIG. 1, except that a fastener 307 is disposed through the openings 17 and 15 (shown in FIG. 1) of the clip plate 7, and beneath the molded case 309a and the molded cover 309b, in order to draw the one side 11 toward the other side 13 and to secure the molded case 309a to the molded cover 309b.

Figure 24:
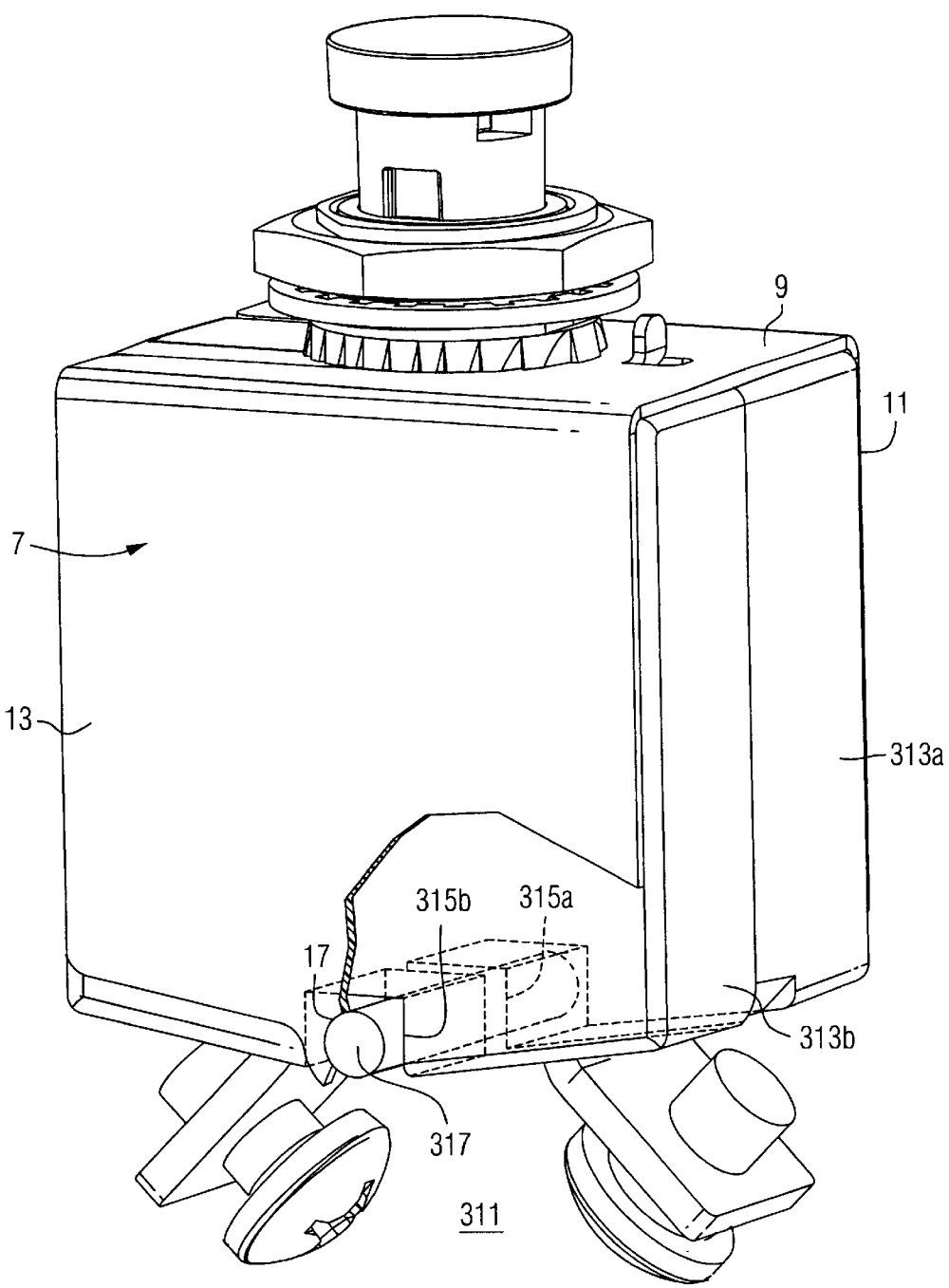

As shown in FIG. 24, a circuit breaker 311 is similar to the circuit breaker 1 of FIG. 1, except that the molded case 313a and the molded cover 313b each have channels 315a,315b, respectively. A fastener 317 is disposed through the openings 15,17 of the clip plate sides 11,13 and within the channels 315a,315b, in order to draw the one side 11 toward the other side 13, thereby, securing the molded case 313a to the molded cover 313b.

The exemplary circuit breaker 1 is a simple and reliable mechanism, which selectively provides multiple protection functions as well as serving as an off/on switch. This arrangement also lends itself to automated assembly. The molded section 3a of the housing 3 is placed on a flat surface and the parts are all inserted from above. The mechanism plate 23, the operating mechanism 22, the handle assembly 35, the latch assembly 51, the bimetals 129,225, and the bonnet assembly 171, all fit into the cavity 5a in this housing section 3a. The trip motor 119 is seated behind the mechanism plate 23, and the PCBs 41,43 are connected by electrical pins 109,111,121,123,131. The PCBs 41,43 extend into the cavity 5b of the housing section 3b. The sections 3a,3b, in turn, are secured together by the clip plate 7 and fastener 21. In one embodiment, the exemplary circuit breaker 1 is about 1 to 1.2 in. tall, about 1 in. wide, and about 0.8 in. thick.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of invention which is to be given the full breadth of the claims appended and any and all equivalents thereof.

What is claimed is:

1. A circuit breaker comprising:
   a housing;
   separable contacts mounted in said housing;
   a latchable operating mechanism including a latch member which when released opens said separable contacts;
   an overcurrent assembly responsive to selected conditions of current flowing through said separable contacts for releasing said latch member to trip said separable contacts open;
   an arc fault indicator;
   an arc fault trip actuator which when energized moves a first latch for actuating said arc fault indicator and a second latch for releasing said latch member to trip said separable contacts open; and
   an arc fault current assembly responsive to selected arc fault conditions of current flowing through said separable contacts for energizing said arc fault trip actuator to actuate said arc fault indicator and to trip said separable contacts open.

2. The circuit breaker of claim 1 wherein said arc fault indicator comprises a movable member and a spring; and wherein said first latch, when moved, allows said movable member to be moved by said spring.

3. The circuit breaker of claim 2 wherein said spring engages said movable member; and wherein said first latch, when moved, releases said spring to move the movable member.

4. The circuit breaker of claim 2 wherein said housing has an opening; wherein a portion of the movable member protrudes through the opening of said housing; and wherein said first latch, when moved, releases said spring to move the portion of the movable member outside of said housing.

5. The circuit breaker of claim 4 wherein said latchable operating mechanism includes an operating handle which protrudes through the opening of the housing; wherein the portion of the movable member which protrudes through the opening of said housing is a ring surrounding said operating handle; and wherein said first latch, when moved, releases said spring to move the ring of the movable member away from the opening of said housing.

6. The circuit breaker of claim 4 wherein said arc fault indicator includes a light; wherein the movable member includes a light pipe having a first end which is normally proximate the light and a second end which is normally illuminated by the light; and wherein said first latch, when moved, releases said spring to move the light pipe of the movable member away from the light.

7. The circuit breaker of claim 1 wherein said arc fault trip actuator comprises a trip motor, which releases said latch member when energized, said trip motor having a magnetic circuit; and wherein said operating mechanism includes a main current conductor connected in series with said separable contacts and routed to induce a magnetic flux in the magnetic circuit of said trip motor which releases said latch member in response to an overcurrent through said main current conductor of at least a predetermined magnitude.

8. The circuit breaker of claim 7 wherein said overcurrent assembly comprises a bimetal, which is heated by current flowing through said separable contacts, said bimetal being deflected by such heating and being coupled to said latch member to move said latch member in response to a persistent overcurrent condition.

9. The circuit breaker of claim 8 wherein said overcurrent assembly further comprises a cantilevered ambient compensation bimetal, said bimetal and said cantilevered ambient compensation bimetal being coupled in series to said second latch to move said latch member in response to said persistent overcurrent condition compensated for ambient conditions.

10. The circuit breaker of claim 1 wherein said circuit breaker is an aircraft circuit breaker.

* * * * *